United States Patent
Ogawa et al.

(10) Patent No.: US 6,628,245 B2
(45) Date of Patent: Sep. 30, 2003

(54) MULTIFUNCTION SWITCH DEVICE WITH DISPLAY FUNCTION

(75) Inventors: Masayuki Ogawa, Shizuoka (JP); Koji Ishii, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 320 days.

(21) Appl. No.: 09/847,430

(22) Filed: May 3, 2001

(65) Prior Publication Data

US 2001/0050671 A1 Dec. 13, 2001

(30) Foreign Application Priority Data

Jun. 9, 2000 (JP) ......................................... 2000-173411

(51) Int. Cl.$^7$ ................................................. G09G 5/00
(52) U.S. Cl. ............................ 345/7; 345/903; 340/461
(58) Field of Search ................................. 345/168, 173, 345/7, 102, 903, 684; 340/461, 462; 701/1, 201

(56) References Cited

U.S. PATENT DOCUMENTS 5,555,502 A * 9/1996 Opel ........................... 340/461
5,916,288 A * 6/1999 Hartman ...................... 340/461
6,476,794 B1 * 11/2002 Kataoka et al. .............. 345/161

FOREIGN PATENT DOCUMENTS

JP 9-198176 7/1997

* cited by examiner

Primary Examiner—Matthew Luu
(74) Attorney, Agent, or Firm—Armstrong, Westerman & Hattori, LLP

(57) ABSTRACT

A multifunction switch device with a display function is provided, which displays a function of a switch presently selected on a switch operating section and simultaneously displays a next selectable function. On a display device 13$d$, which constitutes a MF switch 13 employing a pushing switch, an equipment (function) to be selected next by operating the switch, for example a MD (miniature disc), is simultaneously displayed adjacently to a letter indicating a CD (compact disc) in a different displaying manner from that of the letter indicating the CD, together with an equipment presently selected, for example, an icon indicating the CD and the letter indicating the CD.

4 Claims, 20 Drawing Sheets

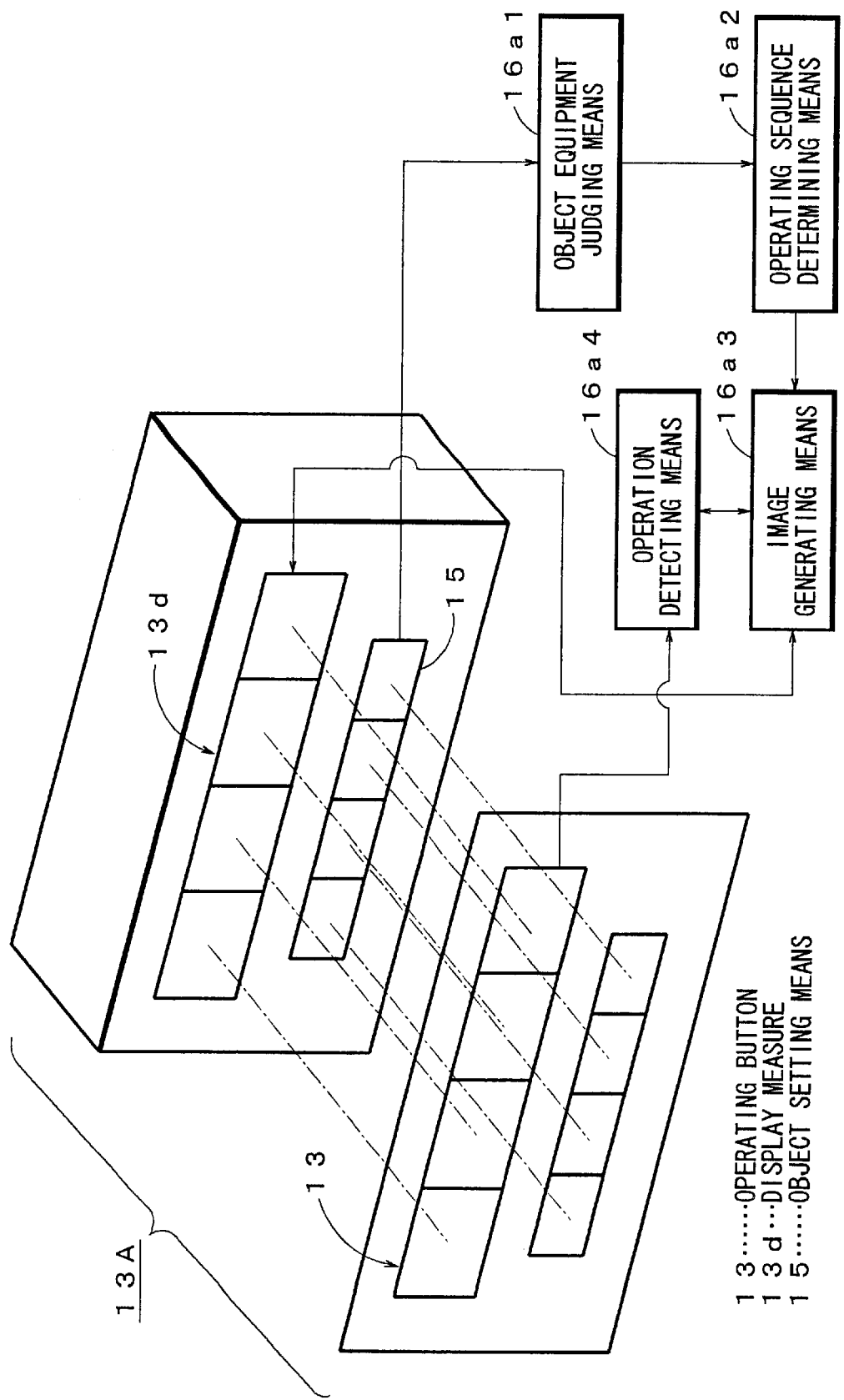

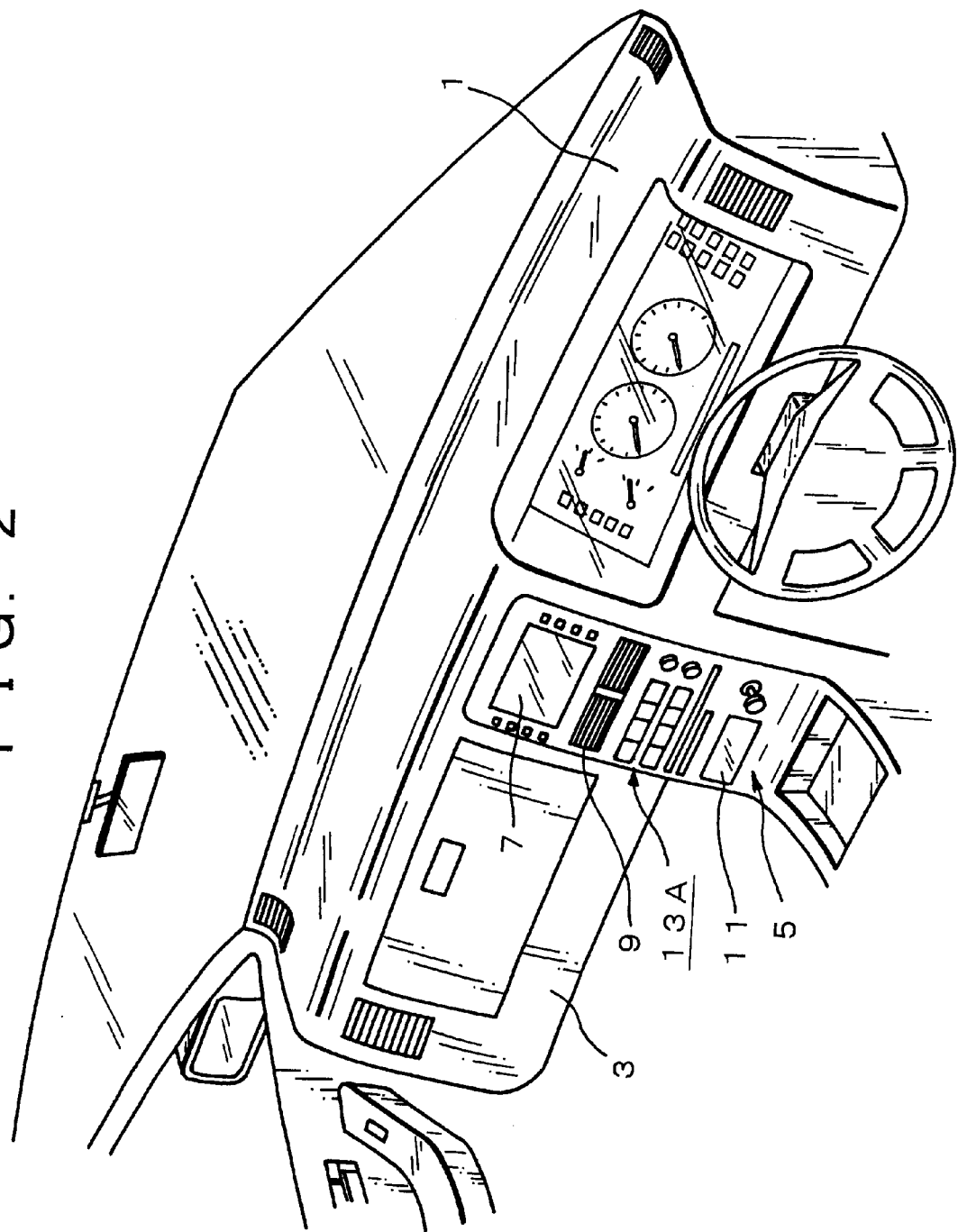

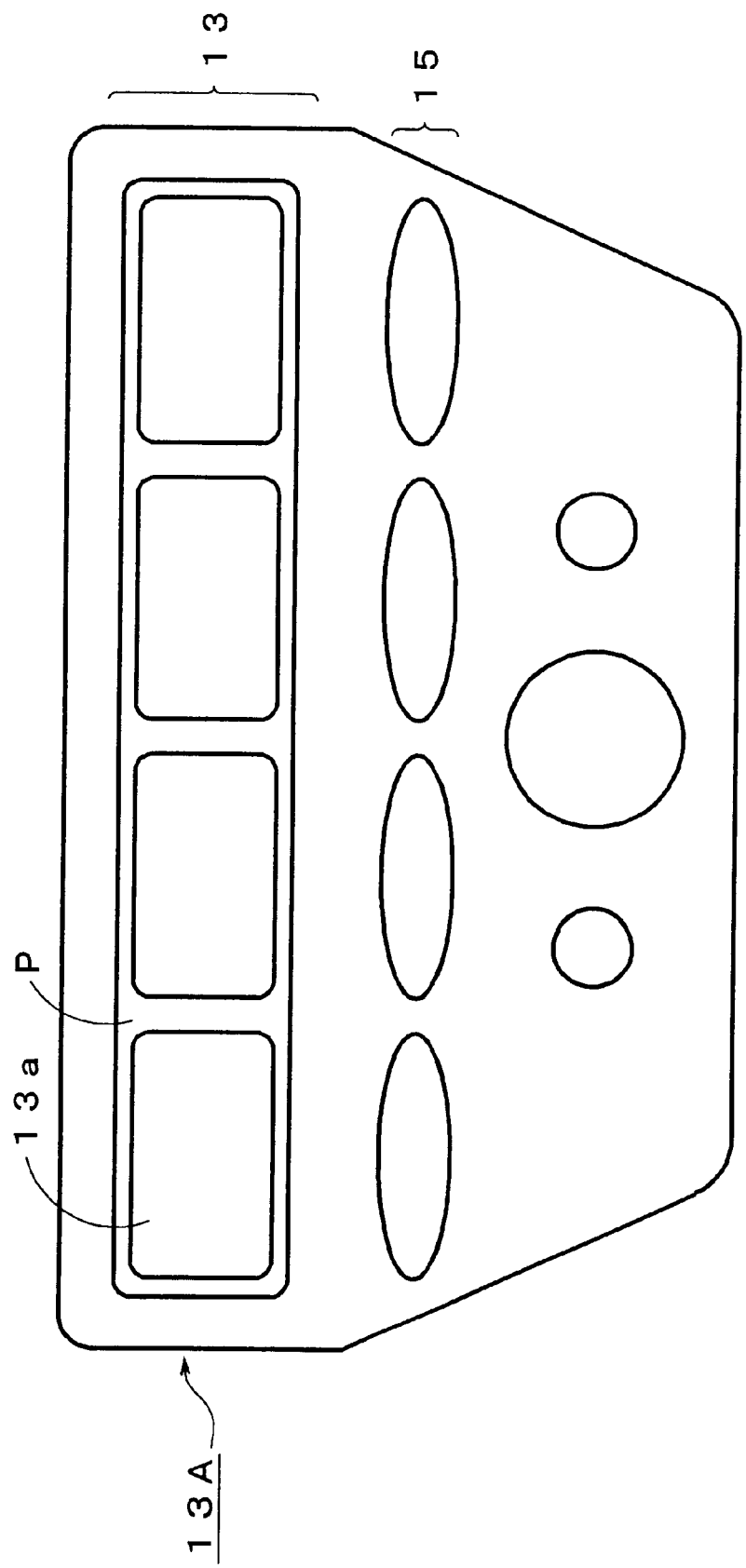

F I G. 1 0
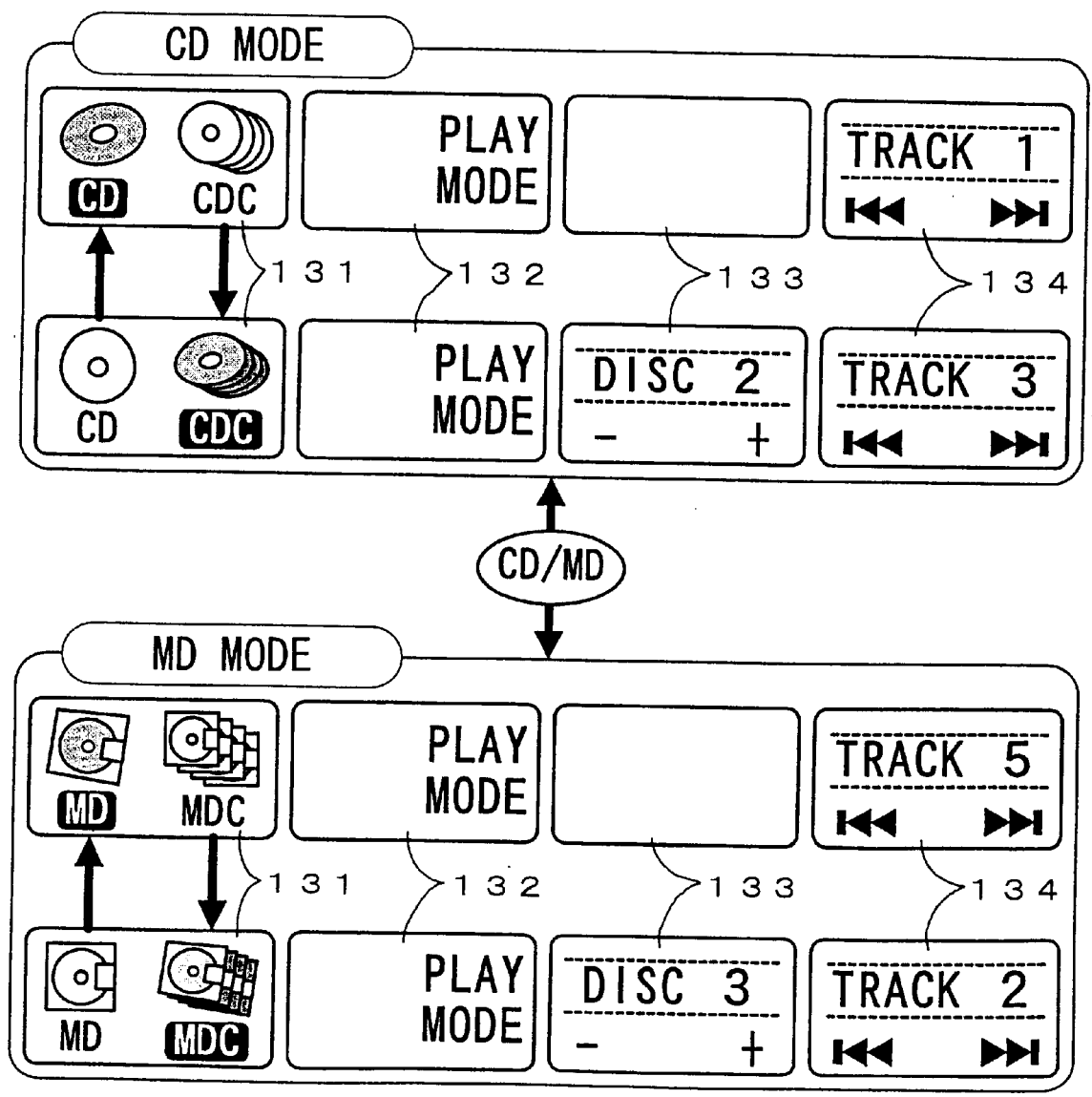

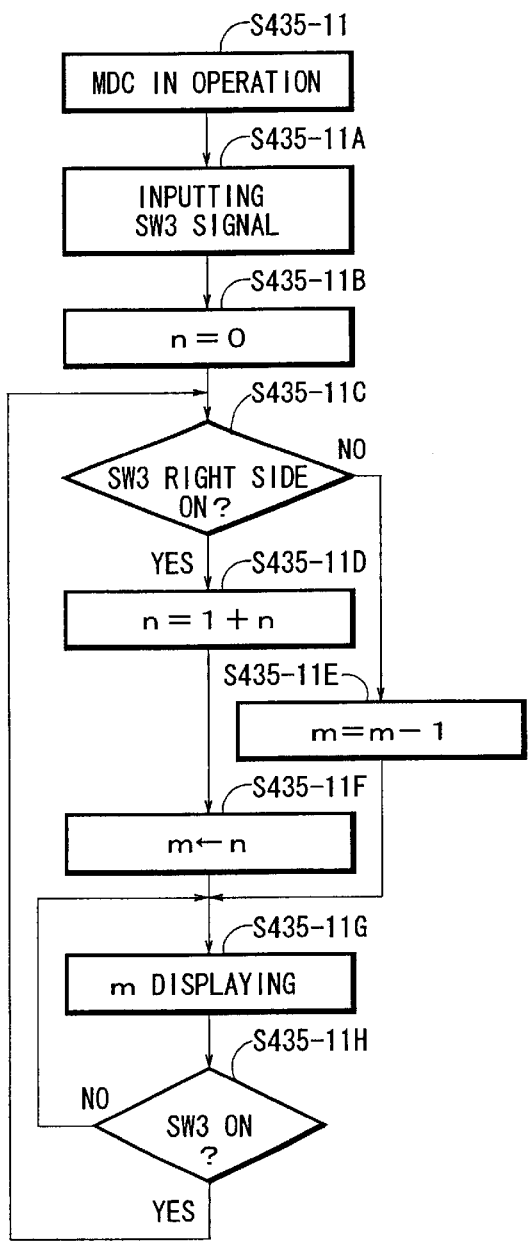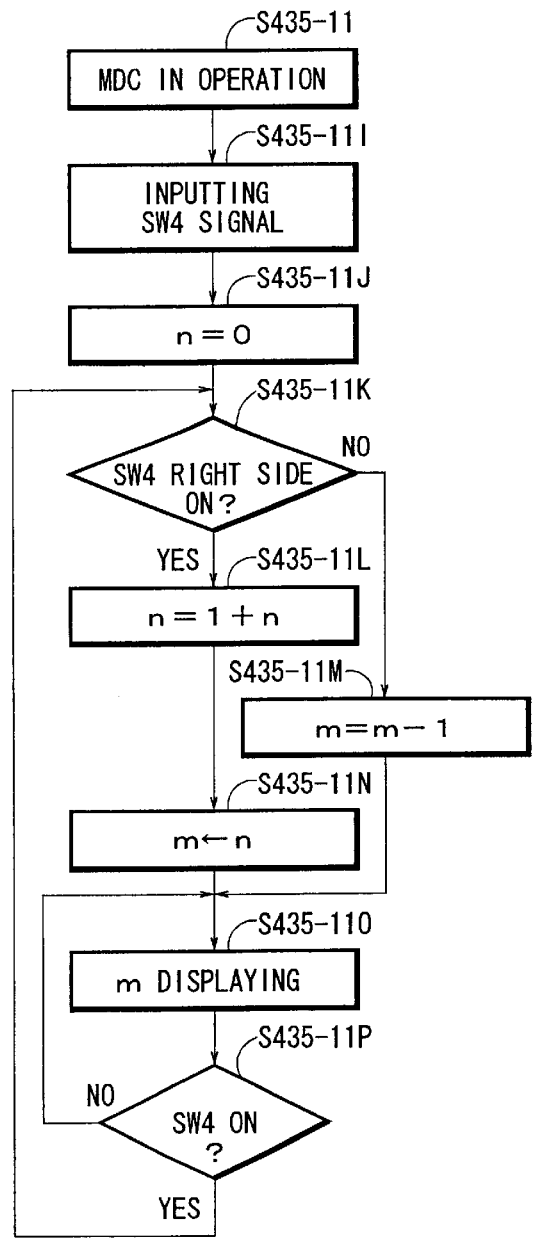

MULTIFUNCTION SWITCH DEVICE WITH DISPLAY FUNCTION

BACKGROUND OF THE INVENTION

1. Field of the Invention

This invention relates to a multifunction switch device with a display function, which displays a function of a switch presently selected on a switch operating section and simultaneously displays a next selectable function.

2. Description of the Related Art

An electric equipment centralized at a center console of a vehicle, such as a car stereo and other audio equipment, needs an operating button for selecting an action, and so far each operating button for a respective electric equipment is separately prepared and arranged on the center console of a vehicle.

However, the function of each electric equipment has been diversified according to the technological progress, which in turn has increased the number of the buttons needed. Therefore, it has gradually become difficult to arrange all the buttons needed on a center console, which has a limited space. In addition, many operating buttons may do damage to a fine sight of the center console.

In order to solve the problems mentioned above, for example, there has been proposed an electronic equipment as disclosed in Japanese Patent Application Laid-Open No. H9-198176, in which a liquid crystal display is arranged at the rear of an operating button and the display of the liquid crystal display is changed so as to change a function display of the operating button, which can be seen through a transparent part or a through hole of the operating button.

In the conventional button, the function of the operating button is displayed by a liquid crystal display and the display of the liquid crystal display is changed according to the function of a switch whenever the function of the switch changes. However, from the present display one can not find which function the function of the switch presently executing can next be changed to, until one actually takes an action for selecting the function of the operating button, therefore there has been a problem that it takes a lot of time to select a function desired.

SUMMARY OF THE INVENTION

It is therefore an objective of the present invention to solve the above problem and to provide a multifunction switch device with a display function, by which one can easily find which function the switch presently executing a certain function can select next from a switch operating section.

In order to attain the above objective, the present invention is to provide a multifunction switch device with a display function comprising: a switch part for displaying a character indicating an operating object equipment on an operating button by a display measure whenever the operating button is operated; setting means for setting up an operating object equipment; judging means for judging an operating object equipment set up on the basis of an output from the setting means; operating sequence determining means for determining an operating object equipment, which is operated next to the operating object equipment presently operated by the operating button, from the judged operating object equipment; image generating means for generating each character, which indicates the operating object equipment presently operated or that to be operated next according to the operating sequence determined by the operating sequence determining means and for transmitting each character to the display measure; and detecting means for detecting an operating of the operating button and for transmitting a detected signal to the image generating means, wherein the image generating means changes each character, which indicates the operating object equipment presently operated or that to be operated next on the basis of the detected signal by the detecting means.

According to the constitution described above, by seeing a character displayed a user can see an operating object equipment that can be selected next, thereby a very handy multifunction switch device can be provided.

The setting means sets up at least two operating object equipments and selectively sets up the operating object equipments.

According to the constitution described above, a desired operating object equipment can be selected with a small number of times for the operation of the switch.

The operating button has a switch part, which can select at least two operating object equipments out of a plurality of the operating object equipments to be operated next with relation to the operating object equipment presently operated, and the image generating means generates at least two character images indicating the operating object equipment to be operated next and transmits each character to the display measure.

According to the constitution described above, a plurality of operating object equipments can be selected with one switching operation, thereby a range for the selection becomes wide.

Upon selecting the operating object equipment to be operated next by the operating button, a character of the operating object equipment presently operated, which is displayed by the display measure, is scrolled to a display of a character of the selected operating object equipment to be operated next so that the character displayed by the display measure is changed.

According to the constitution described above, an operating object equipment to be operated next can be clearly confirmed.

BRIEF DESCRIPTION OF THE DRAWINGS

FIG. 1 illustrates a basic constitution of a multifunction switch device with a display function according to the present invention;

FIG. 2 is a perspective view illustrating a vehicle dashboard including a center console, to which the multifunction switch device with a display function according to the present invention can be applied;

FIG. 3 is a front view illustrating a primary part of a multifunction switch device with a display function according to a first preferred embodiment of the present invention;

Figure 7A:
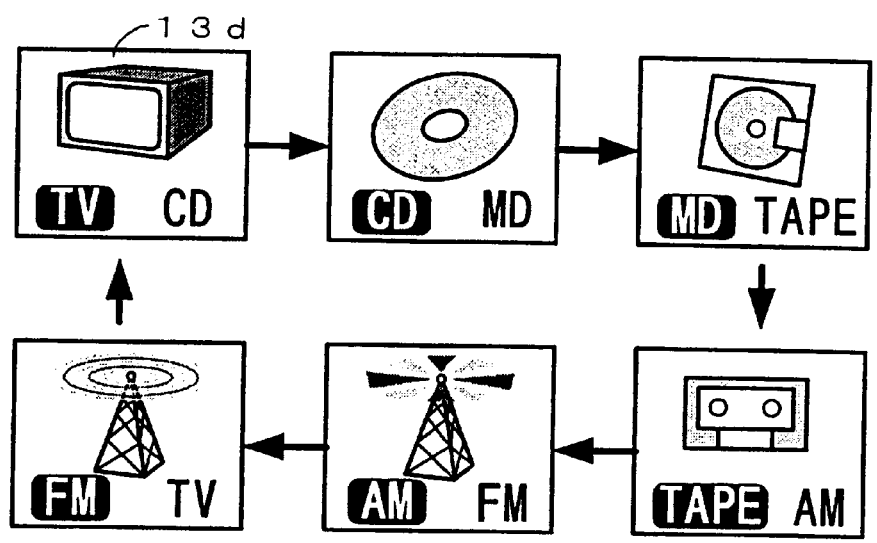
Figure 7B:
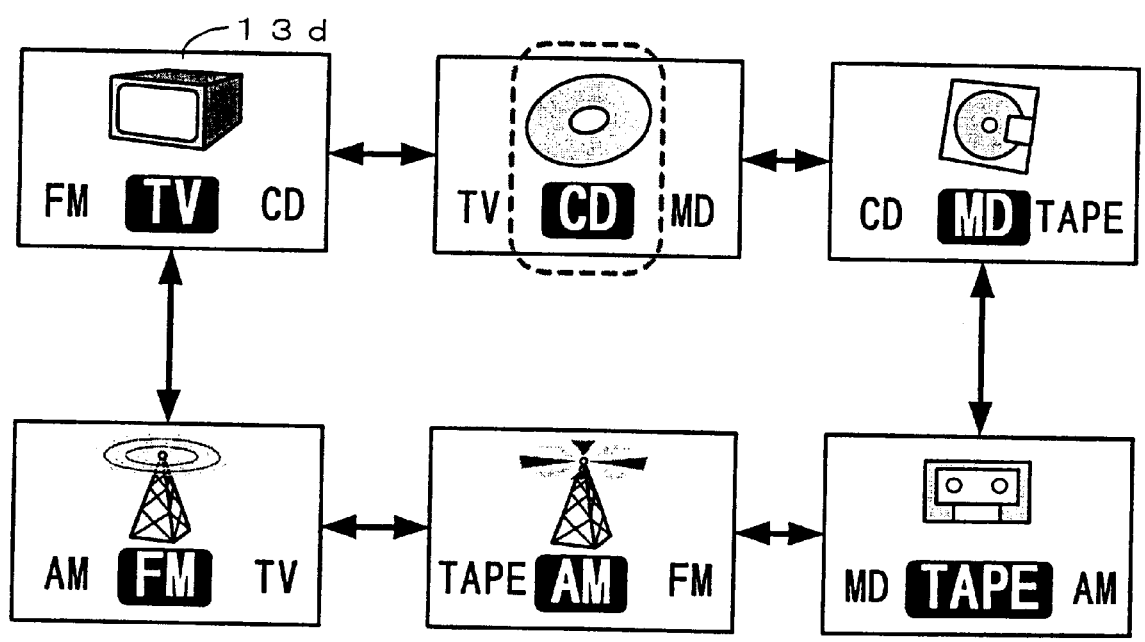
Figure 7C:
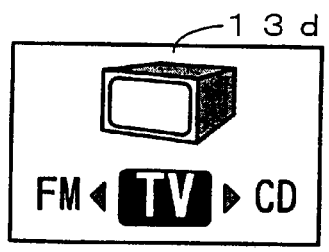
Figure 8A:
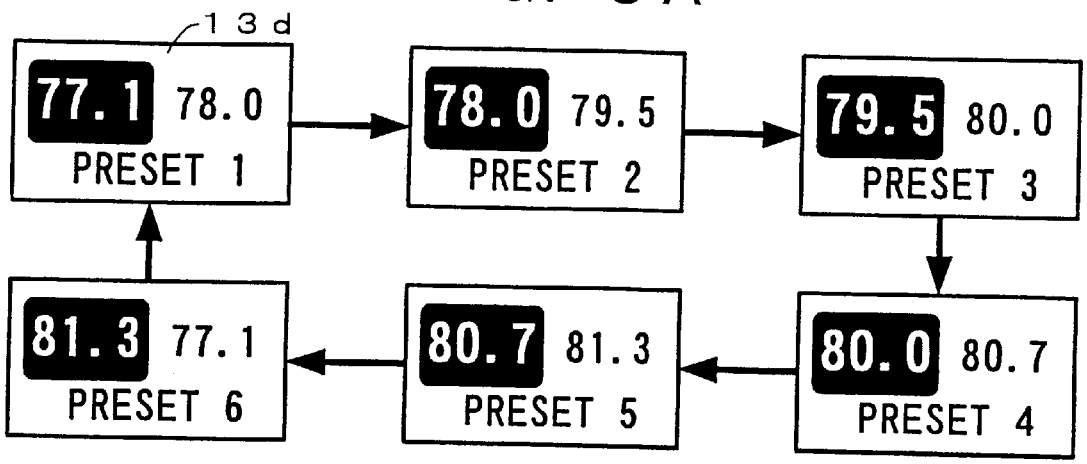
Figure 8B:
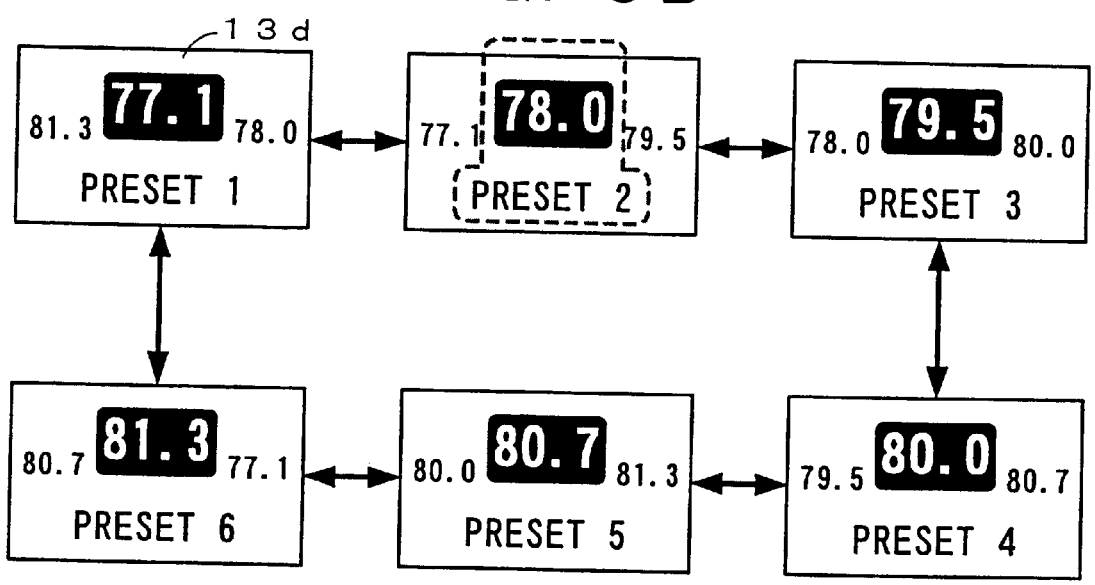
Figure 8C:
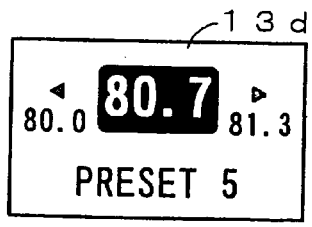
Figure 9:
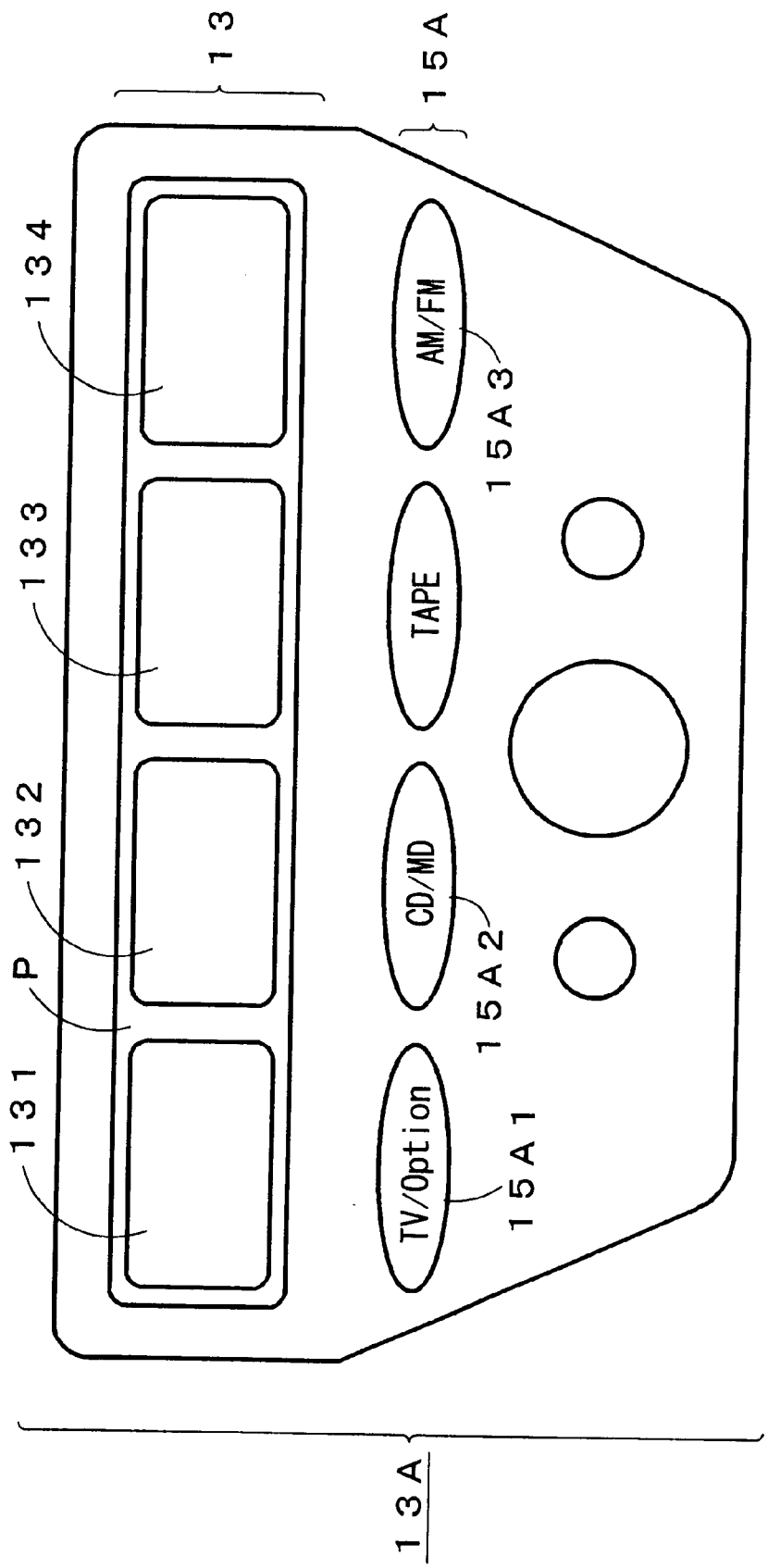
Figure 11:
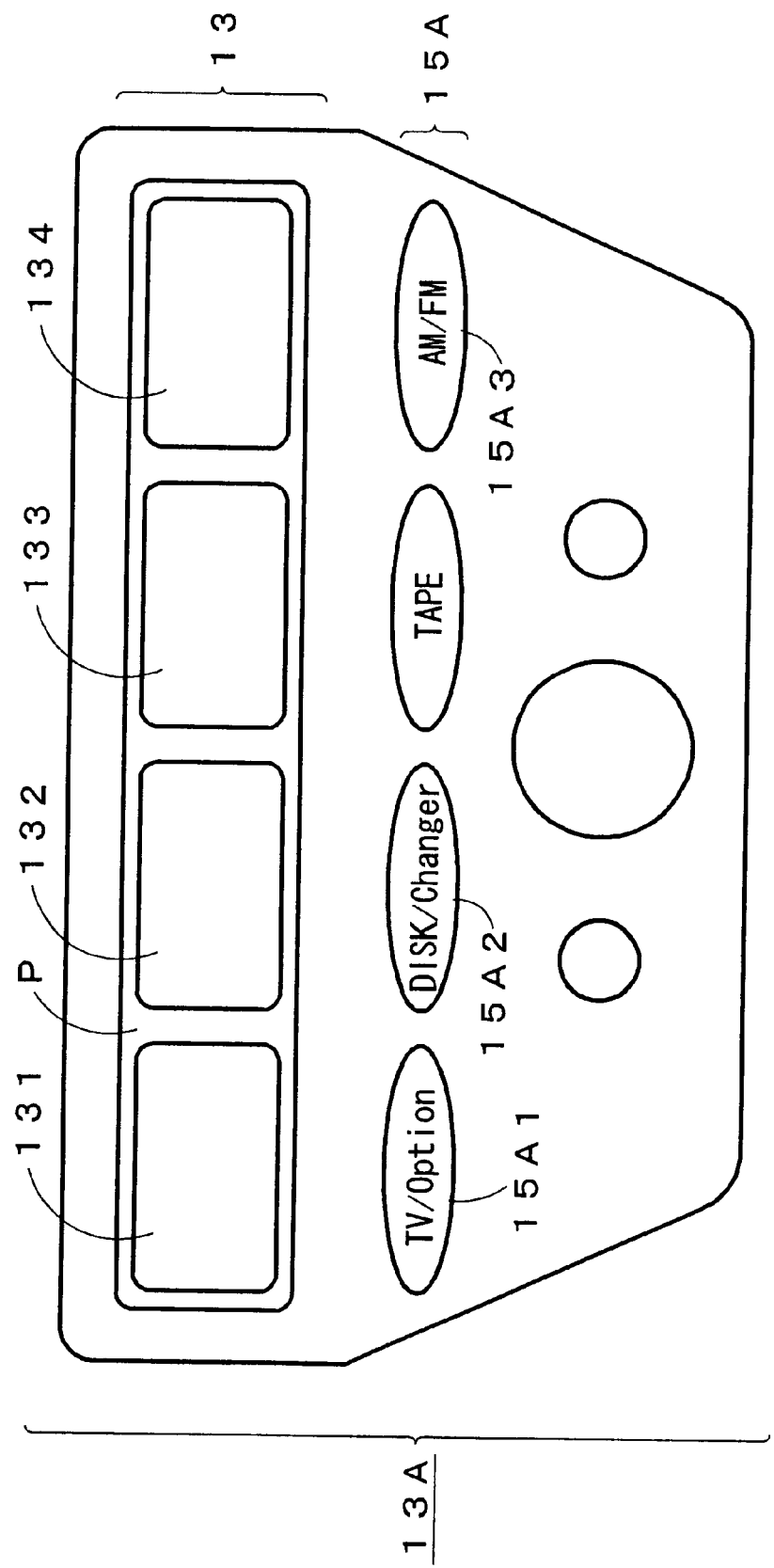
Figure 12:
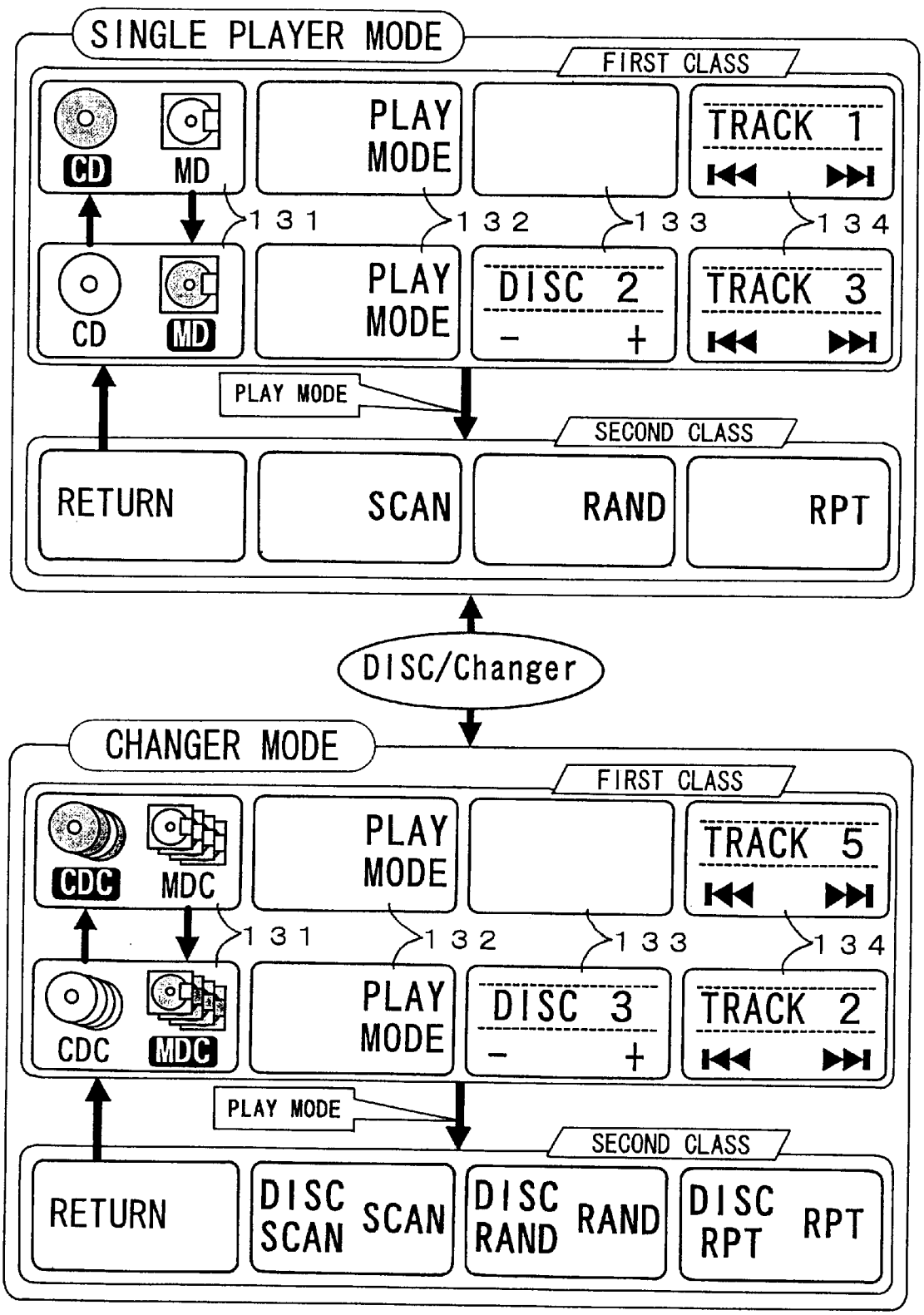
Figure 13:
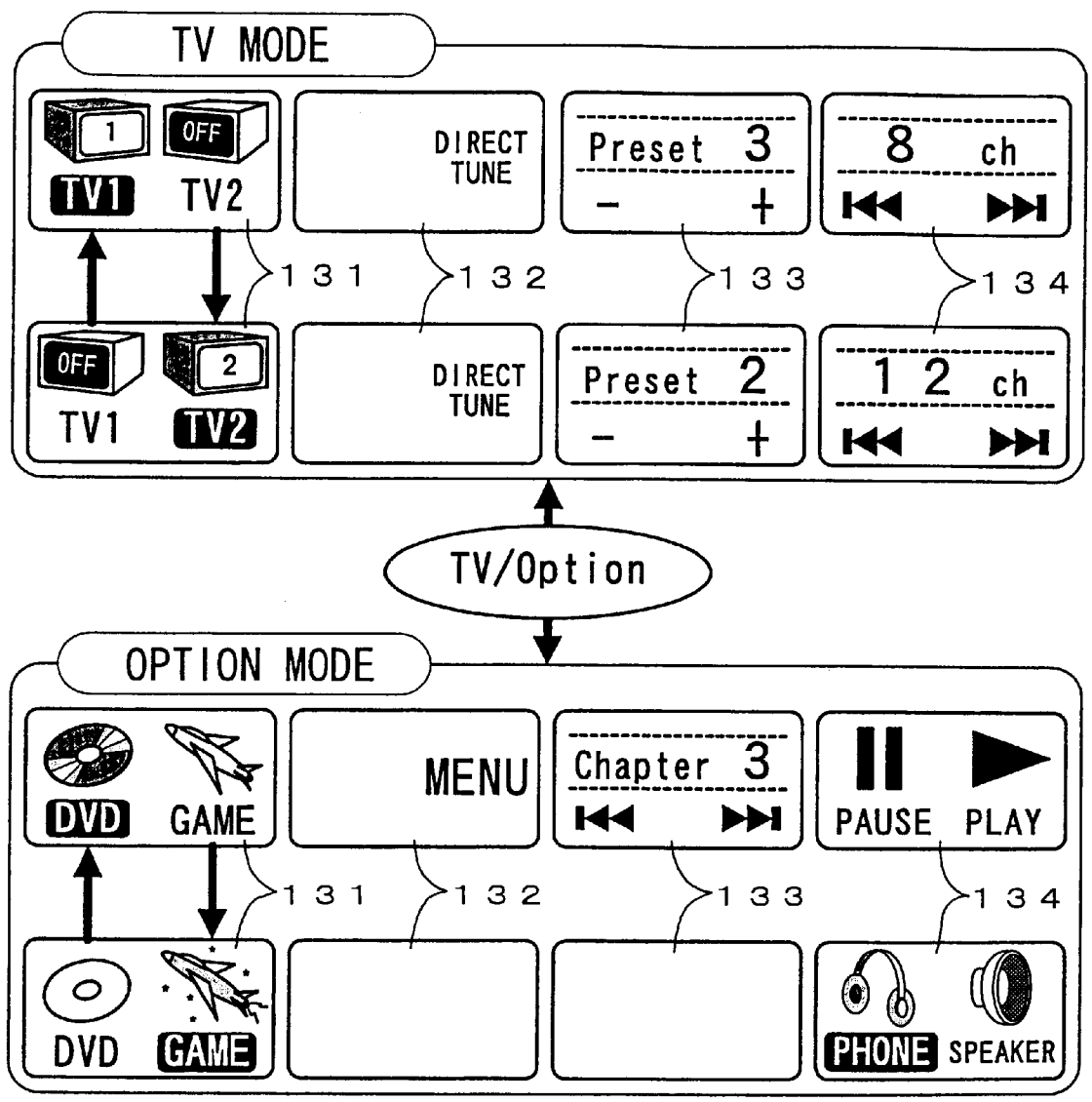
Figure 14:
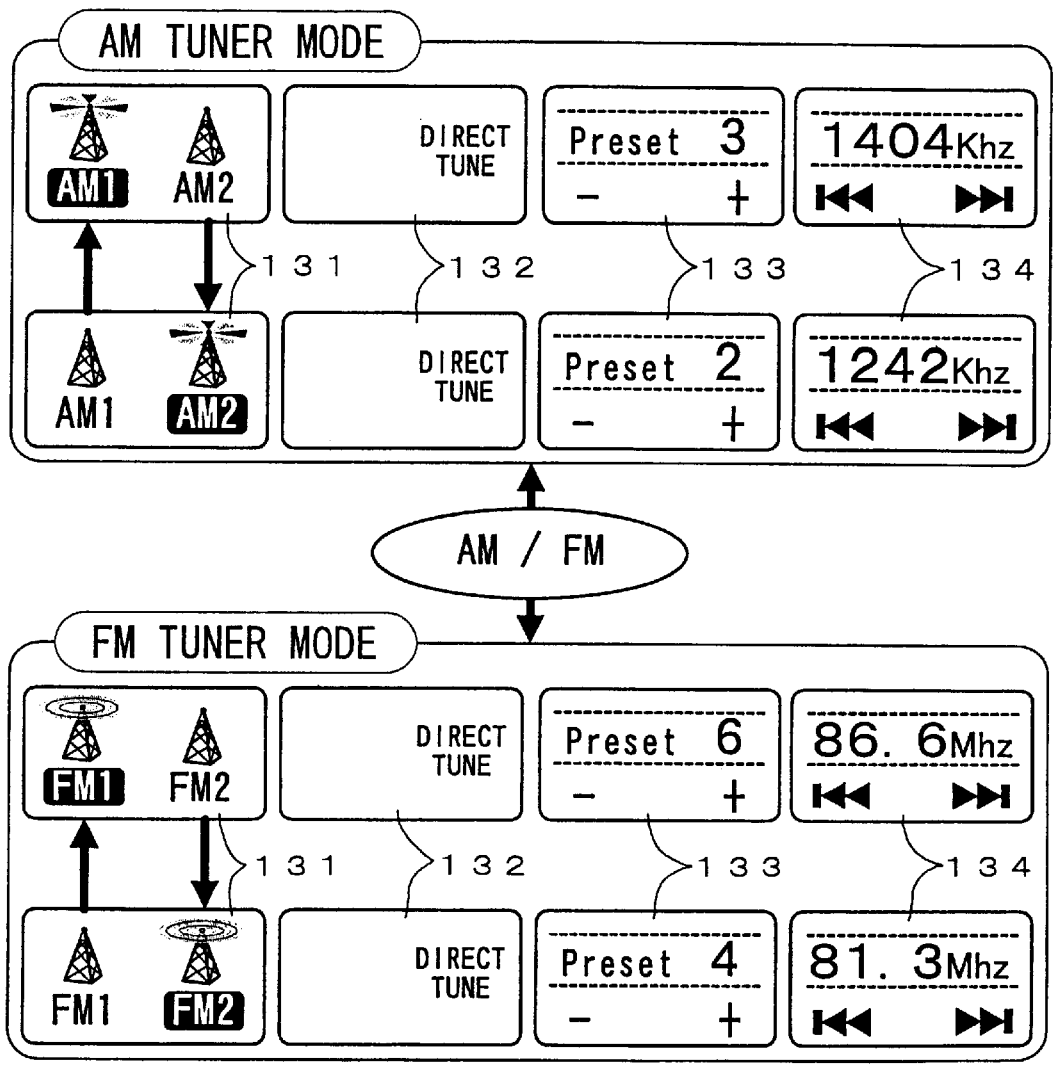
Figure 15:
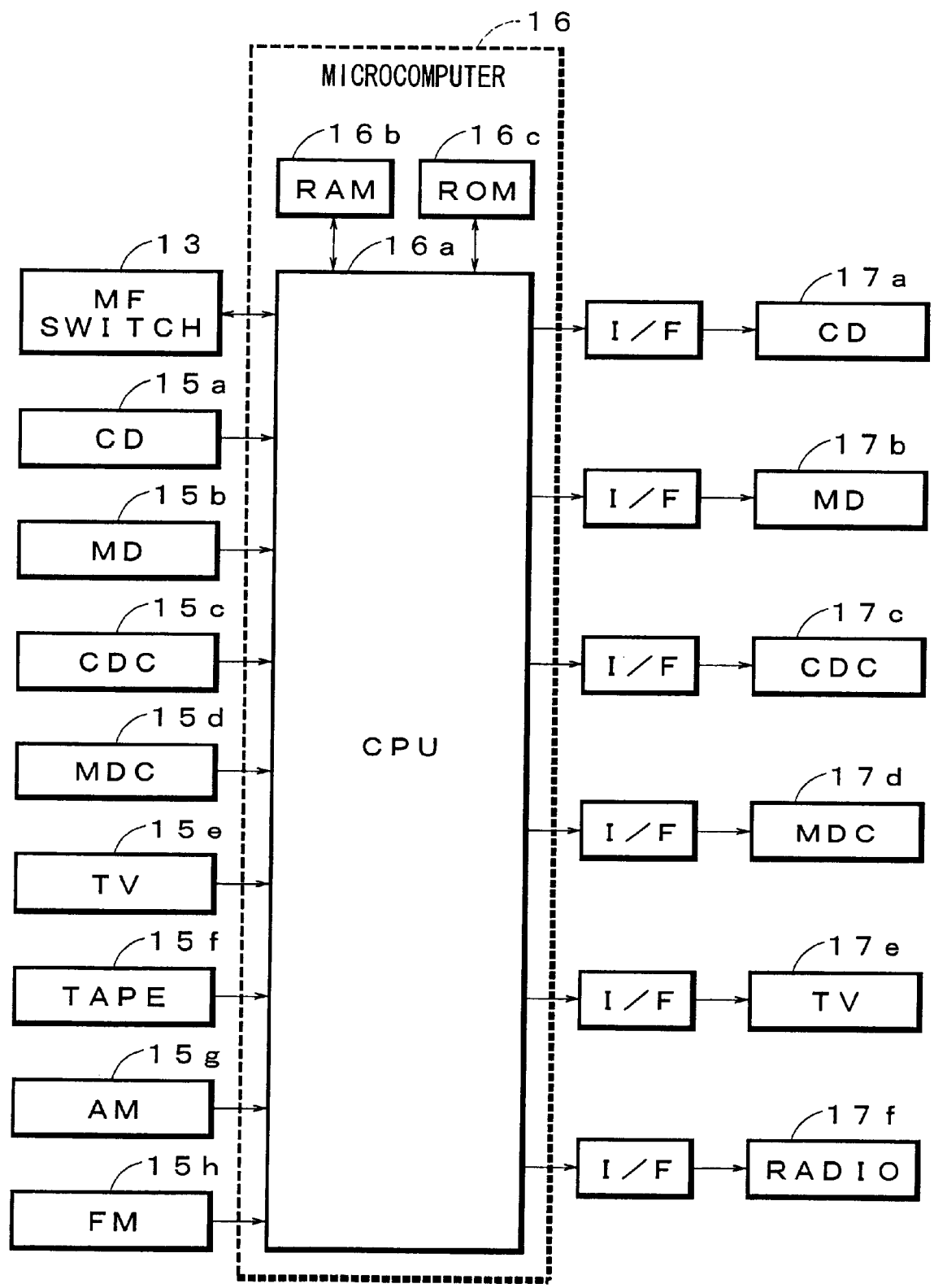
Figure 16:
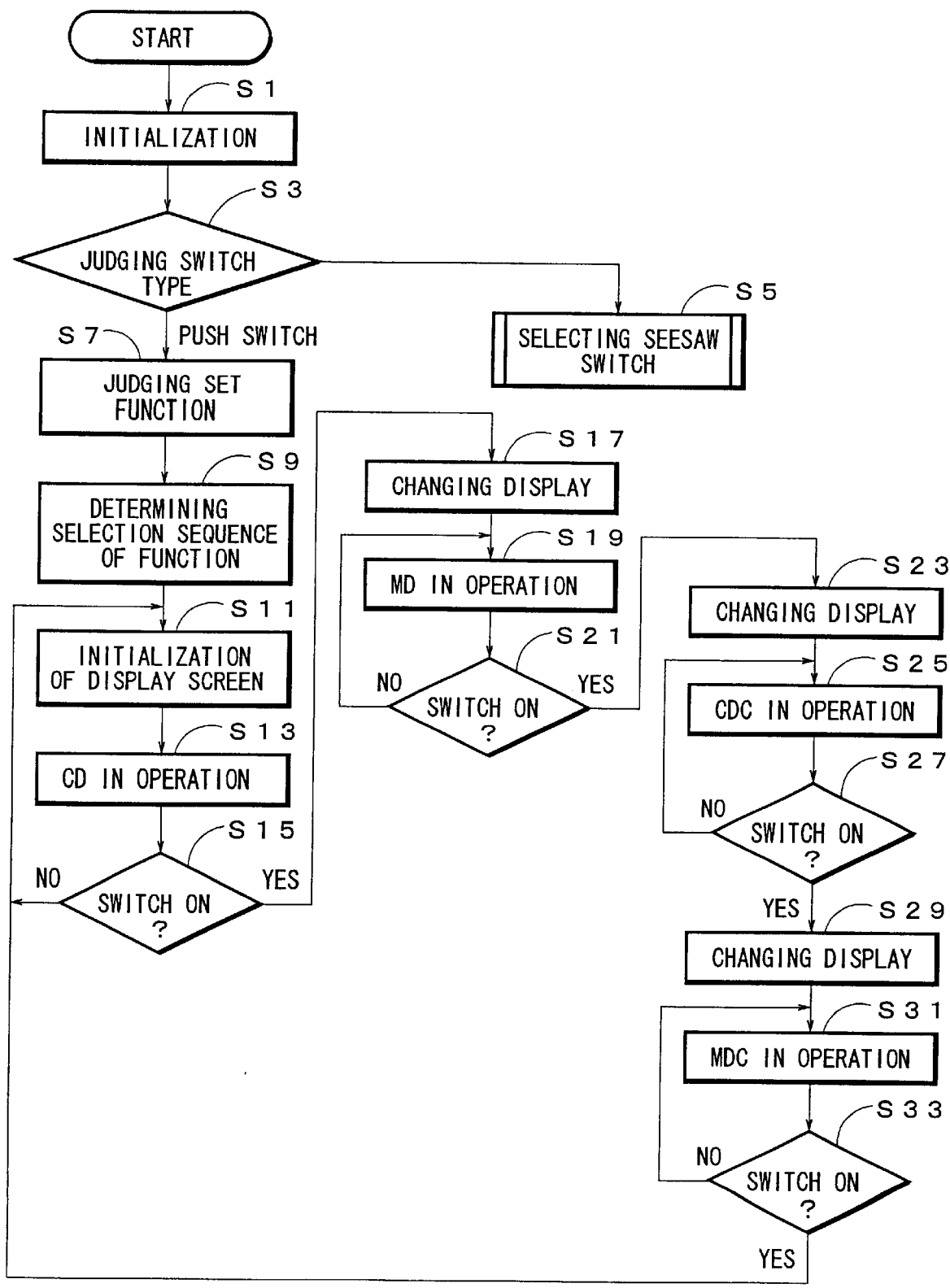
Figure 17:
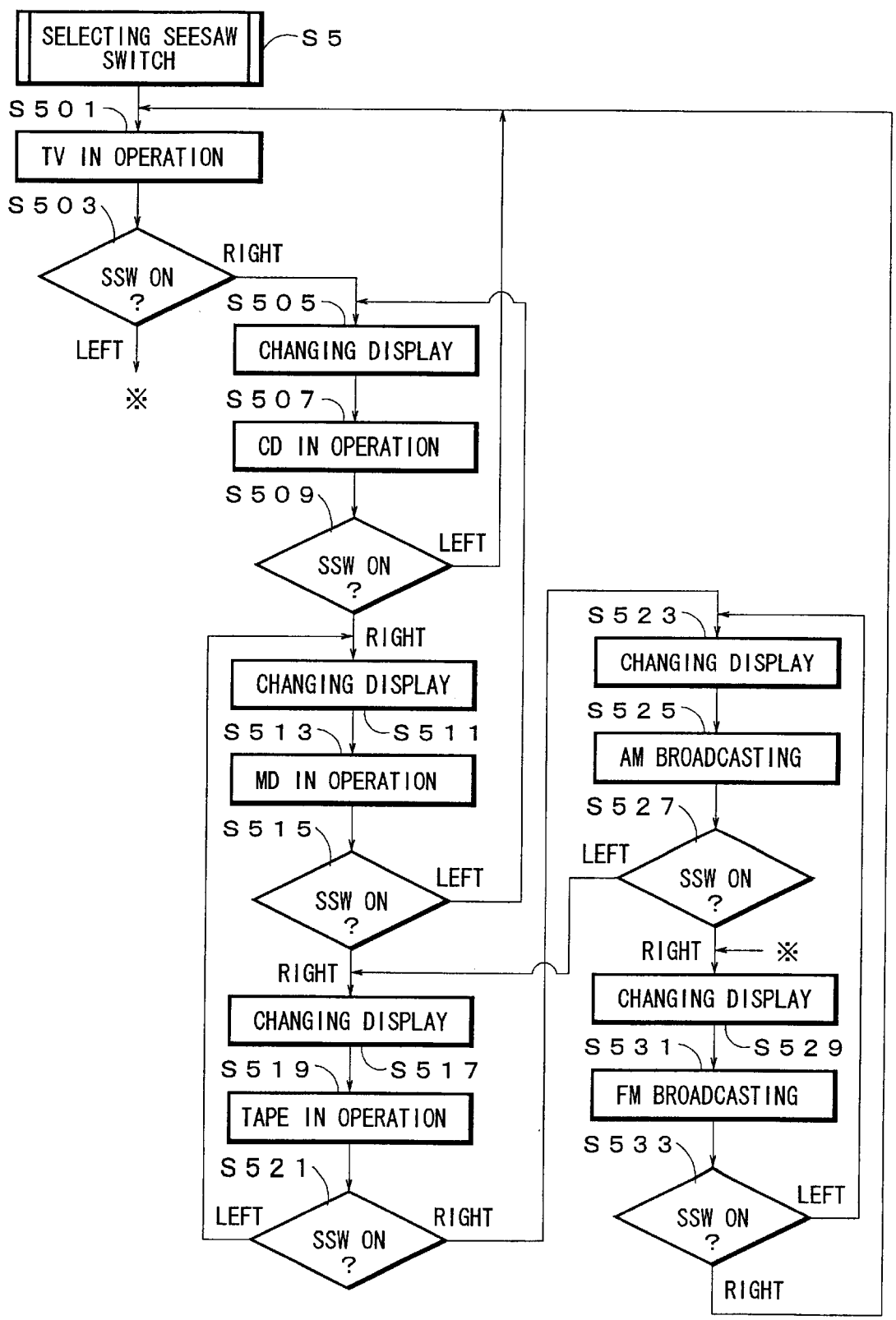
Figure 18A:
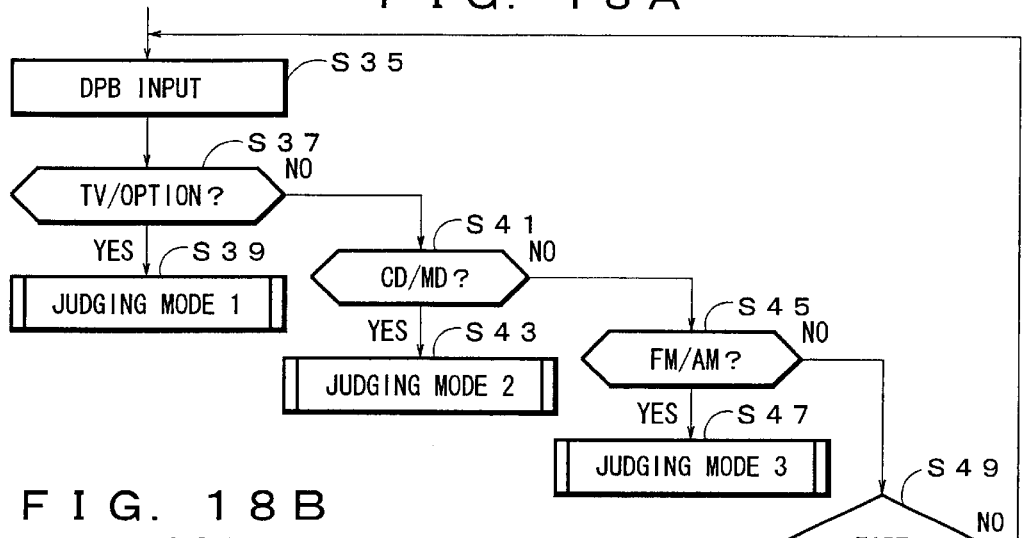
Figure 18B:
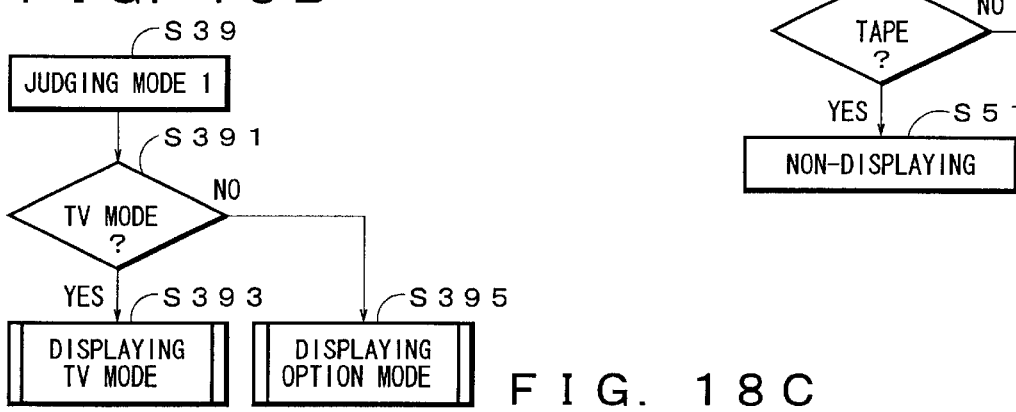
Figure 18C:
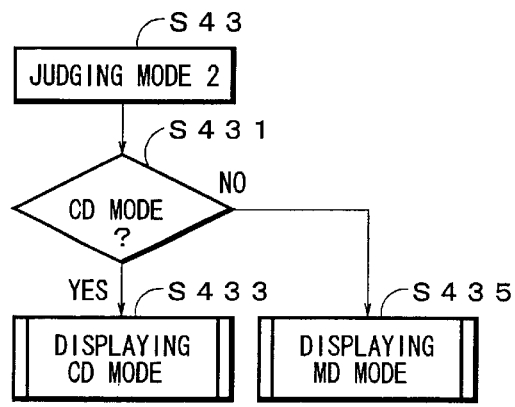
Figure 18D:
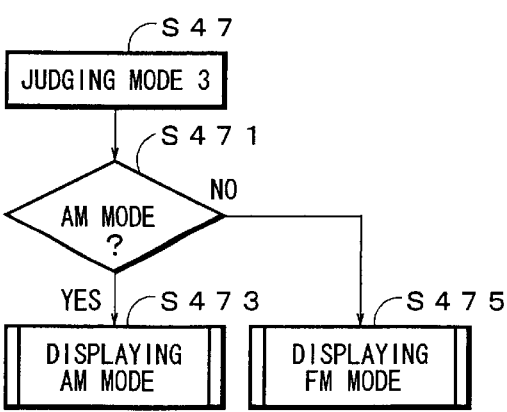
Figure 19:
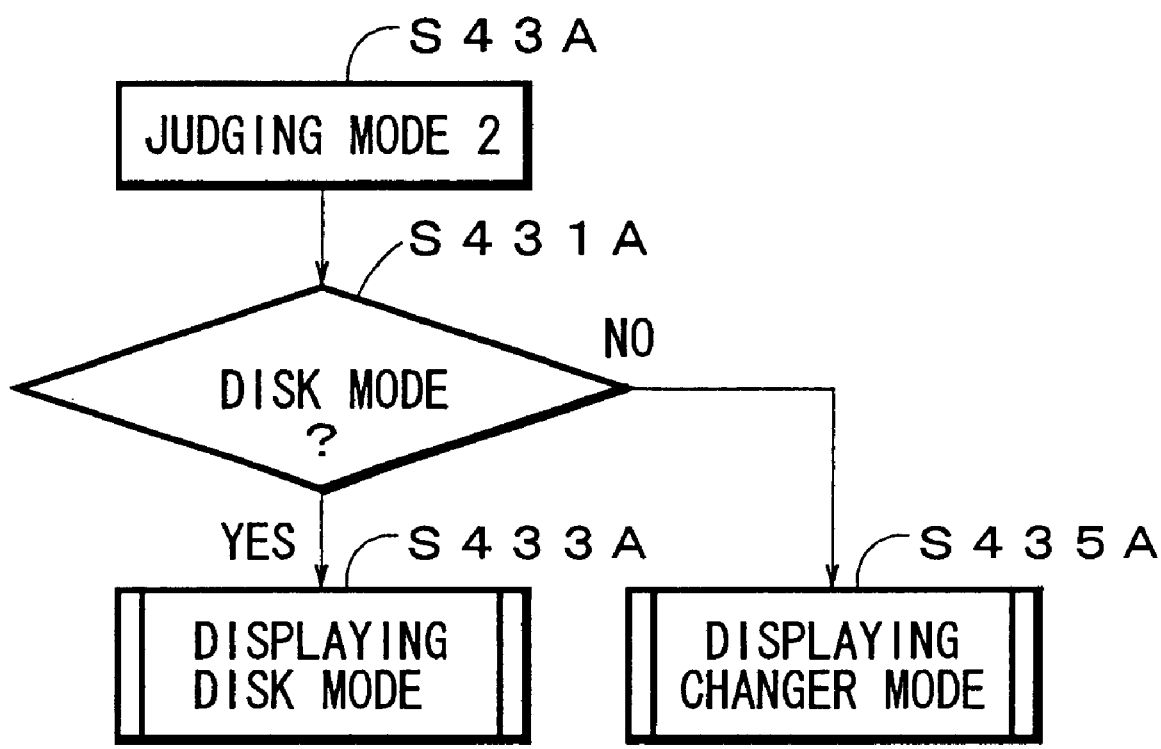
Figure 20A:
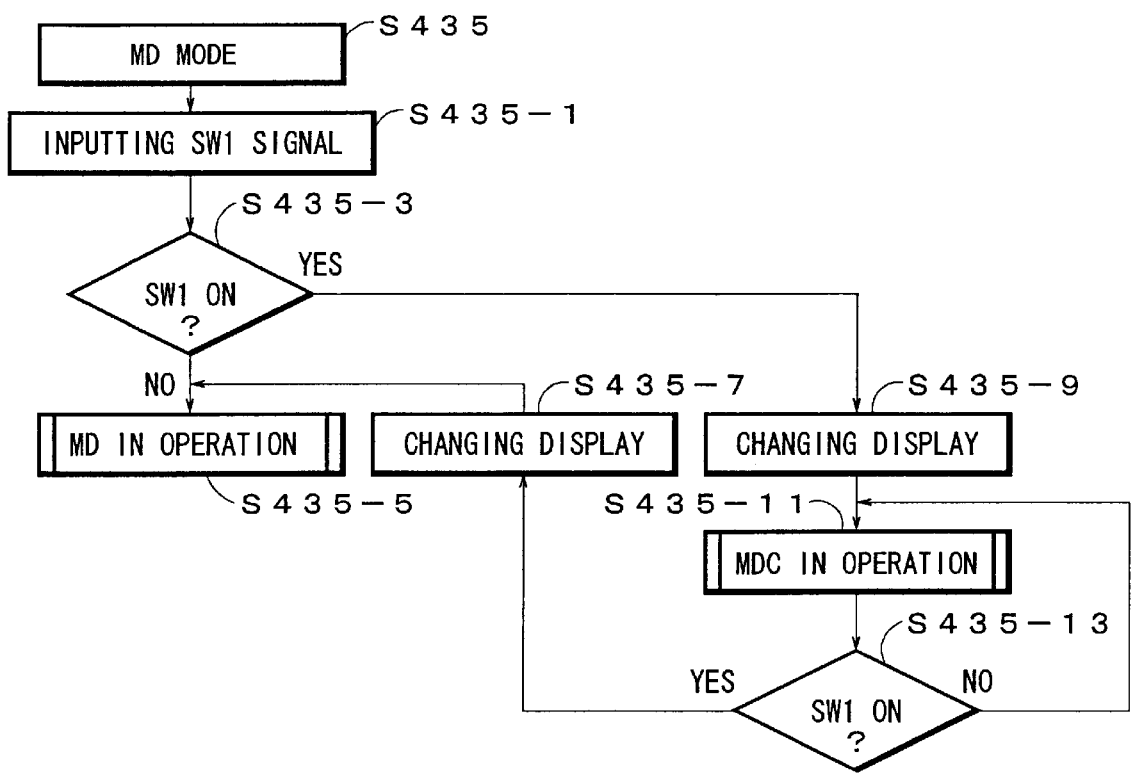
Figure 20B:
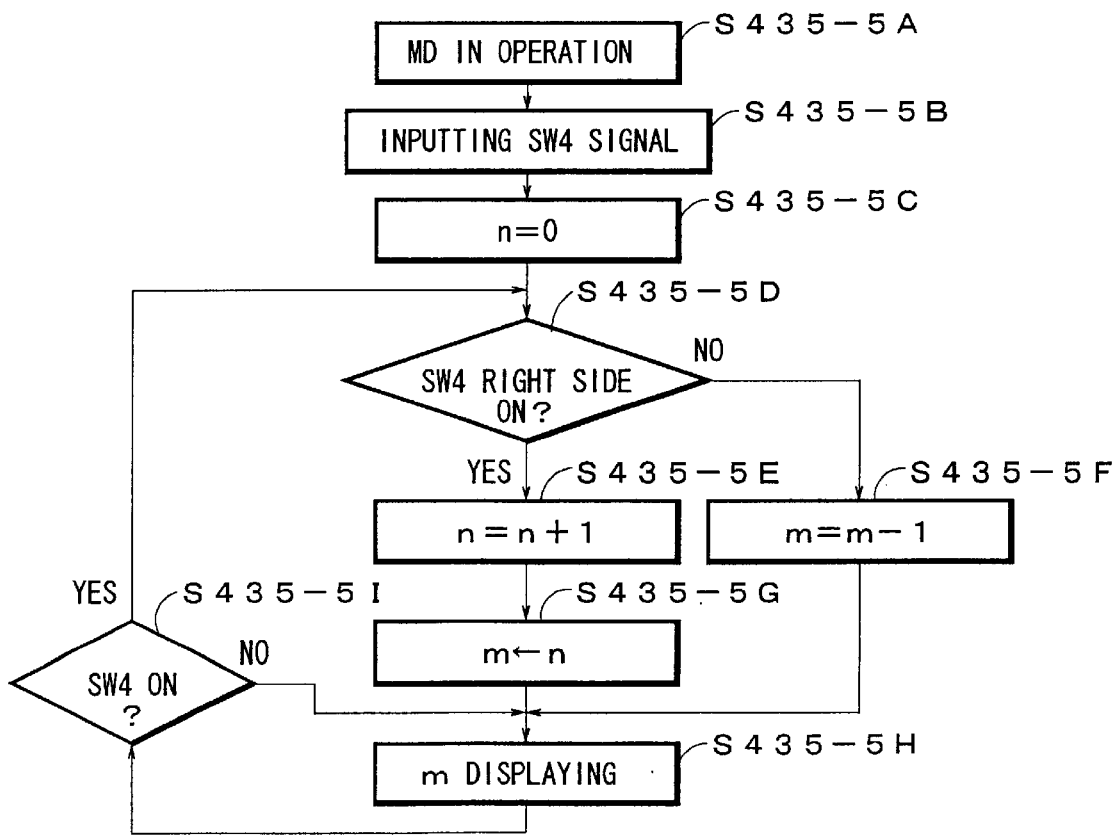

Each of FIGS. 6A to 6D illustrates a transition between an icon of an equipment presently selected and that of an equipment to be selected next among the same kinds of equipment, which is displayed on a display screen 13a of the multifunction switch of FIG. 3;

Each of FIGS. 7A to 7C illustrates a transition between an icon of an equipment presently selected and that of an equipment to be selected next among the different kinds of equipment, which is displayed on a display screen 13a of the multifunction switch of FIG. 3;

Each of FIGS. 8A to 8C illustrates a transition between a receiving frequency presently selected and that to be selected next, which is displayed on a display screen 13a of the multifunction switch of FIG. 3;

FIG. 9 is a front view illustrating a primary part of a multifunction switch device with a display function according to a second preferred embodiment of the present invention;

FIG. 10 illustrates guiding images of a CD mode and a MD mode, which are displayed on a display screen of FIG. 9;

FIG. 11 is a front view illustrating a primary part of a modified example of the multifunction switch device with a display function according to a second preferred embodiment of the present invention;

FIG. 12 illustrates guiding images of a DISC mode and a Changer mode, which are displayed on a display screen of FIG. 11;

FIG. 13 illustrates guiding images of a TV mode and an Option mode, which are displayed on a display screen of FIG. 11;

FIG. 14 illustrates guiding images of an AM mode and a FM mode, which are displayed on a display screen of FIG. 11;

FIG. 15 is a block diagram illustrating an electrical constitution of a multifunction switch device with a display function according to the present invention;

FIG. 16 is a flow chart illustrating a processing, which is carried out by the CPU in accordance with a controlling program installed in a ROM of a microcomputer shown in FIG. 15;

FIG. 17 is a flow chart illustrating a processing, which is carried out by the CPU in accordance with a controlling program installed in a ROM of a microcomputer shown in FIG. 15;

Each of FIGS. 18A to 18D is a flow chart illustrating a processing, which is carried out by the CPU in accordance with a controlling program installed in a ROM of a microcomputer shown in FIG. 15;

FIG. 19 is a flow chart illustrating a processing, which is carried out by the CPU in accordance with a controlling program installed in a ROM of a microcomputer shown in FIG. 15;

Each of FIGS. 20A and 20B is a flow chart illustrating a processing, which is carried out by the CPU in accordance with a controlling program installed in a ROM of a microcomputer shown in FIG. 15; and Each of FIGS. 21A and 21B is a flow chart illustrating a processing, which is carried out by the CPU in accordance with a controlling program installed in a ROM of a microcomputer shown in FIG. 15.

DESCRIPTION OF THE PREFERRED EMBODIMENTS

First Preferred Embodiment

In the following, a multifunction switch device with a display function according to a first preferred embodiment of the present invention will be explained with reference to the attached drawings. Hereinafter, "a multifunction switch device with a display function" is simply called as "switch device".

To begin with, an example of the object, to which the switch device according to the present invention is applied, will be explained with reference to FIG. 2.

FIG. 2 is a perspective view illustrating a vehicle dashboard including a center console, to which the switch device according to the present invention can be applied. In FIG. 2, the reference numeral 1 indicates a dashboard and 3 indicates an instrument panel. At the central portion of the instrument panel 3 in the width direction of the vehicle, there is disposed a center console 5. In the center console 5, there are integrated a display screen 7 for the navigation and the switch device 13A according to the first preferred embodiment, which is put above and below between an outlet 9 of an air-conditioner and an ashtray 11.

As shown in FIG. 3, in the switch device 13A there are arranged a multifunction switch (hereinafter, MF switch) 13 with a display function and buttons 15 for setting reservation consisting of buttons for setting operational reservation of a television, compact disc, cassette tape, radio and the like in the vehicle, which are not shown in the figure.

Figure 4:
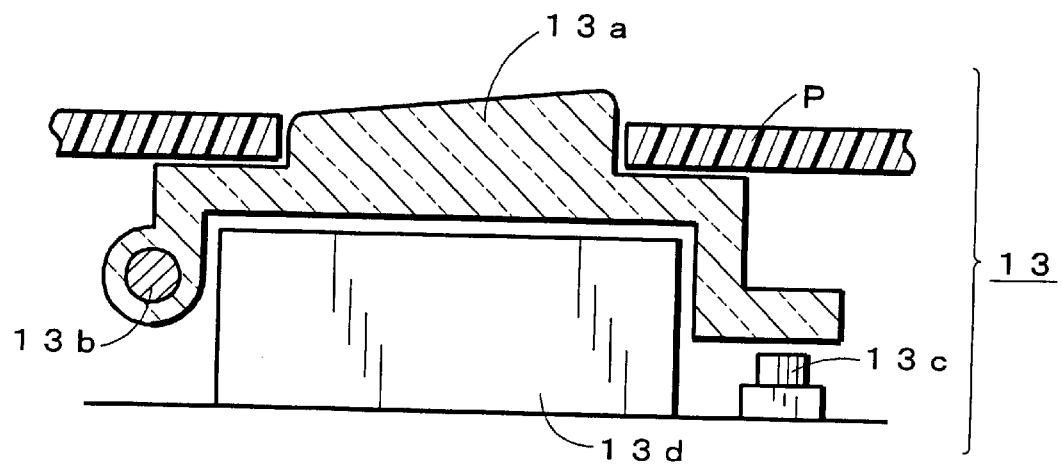
FIG. 4 is a longitudinal cross section of a multifunction switch device employing a pushing switch.
Figure 5:
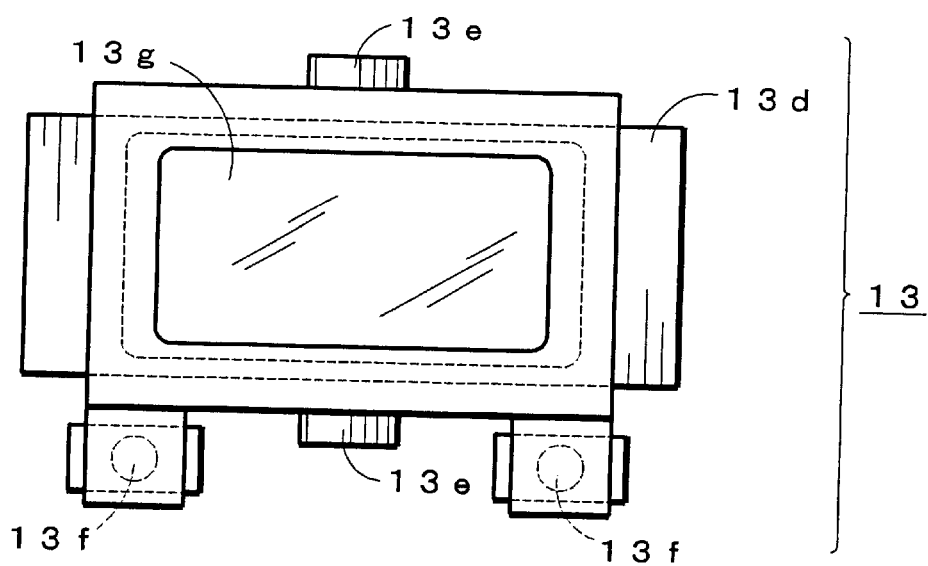
FIG. 5 is a longitudinal cross section of a multifunction switch device employing a seesaw switch.

The MF switch 13 includes a push-type switch (hereinafter, push switch), a section view of which is shown in FIG. 4, and a seesaw-type switch (hereinafter, seesaw switch), a plan view of which is shown in FIG. 5.

In the MF switch 13 employing a push switch, a part of a key-top 13a made of transparent acrylic resin is exposed on the surface of a switching panel P, and one end of the key-top 13a is held by a shaft 13b on the back of the switching panel P while an opposite end thereof abuts against a push-button part of a switch 13c disposed at the back of the switching panel P. Therefore, when the key-top 13a is pushed down from the switching panel P side, the key-top 13a rotates around the shaft 13b to press the push-button part of the switch 13c, thereby the ON-operation is attained.

At the back of the key-top 13a, there is disposed a display device 13d consisting of electroluminescent elements on the same plane with that of the switch 13c. On the display device 13d, a function of the MF switch 13 presently selected is displayed by letters together with icons. Simultaneously, on the display device 13d, a next function selected by an operation of the MF switch 13 is displayed by letters with a different displaying image from that by letters of the function presently selected.

The display device 13d is not limited to electroluminescent elements. Any flat panel display such as VFD, FED and LCD can be employed.

As shown in FIG. 5, in the MF switch 13 emptying a seesaw switch, a part of the key-top 13g is also exposed on an upper surface of the switching panel P, at the back thereof the key-top 13g forms a pair of bearings in up and down directions from the center and is rotatably held on the back of the switching panel P by a shaft 13e via the bearings. Also, at the back of the key-top 13g, each end of the side where the respective bearing is formed is provided with a projection facing downward. Under each projection there is arranged the push-button part of a switch 13f. At the back of the key-top 13g, there is disposed a display device 13d consisting of, for example, electroluminescent elements on the same plane with that of the switch 13f.

Therefore, when the right end of the key-top 13g is pressed down from the switching panel P side, the key-top 13g rotates around the shaft 13e to press the push-button part of the switch 13f at the right end side with the right end side projection, threreby the ON-operation is attained. On the other hand, when the left end of the key-top 13g is pressed down, the key-top 13g rotates around the shaft 13e to press the push-button part of the switch 13f at the left end side with the left end side projection, threreby the ON-operation is attained.

Like a default mode display as shown in FIGS. 6A to 6D, in the display device 13d, which constitutes the MF switch 13 employing a pushing switch, a letter indicating an equipment to be selected next by an operation of the switch, for example a letter "MD (miniature disc)" is simultaneously displayed adjacently to a letter indicating a CD (compact disc) with a different displaying image from that of the letter indicating the CD, together with an icon indicating the CD and the letter indicating the CD of an equipment presently selected.

Figure 6A:
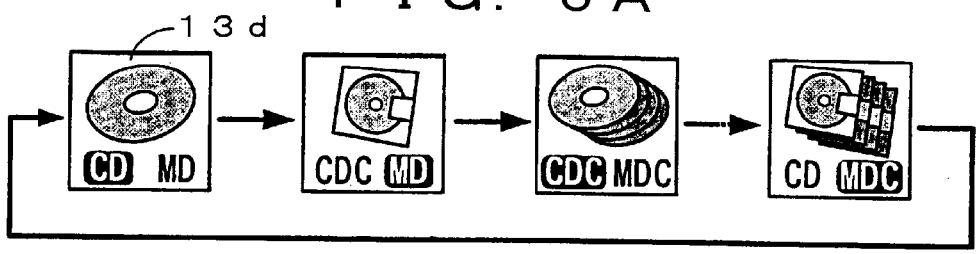

Explaining a change in the display of the display device with reference to FIG. 6A, when the icon of CD indicating the presently selected function is displayed on the display device 13d, a letter "CD" is displayed under the icon with a white design on a black background, then a letter "MD" to be selected next is displayed adjacently to the letter "CD" with a normal displaying image. Owing to this difference in the displaying image of the letters, an user, for example the driver of the vehicle can recognize a switching from the CD play to the MD play upon operating the MF switch 13.

When the MF switch 13 is actually pressed, the MF switch 13 select MD as a function, the icon changes from CD to MD, a letter indicating the function presently selected is changed from "CD" to "MD", and a letter "CDC" indicating a function that is selected next is displayed adjacently to a letter "MD".

When the MF switch 13 is pressed again, the MF switch 13 select CDC as a function, the icon changes from MD to CDC, a letter indicating the function presently selected is changed from "MD" to "CDC", and a letter "MDC" indicating a function that is selected next is displayed adjacently to the letter "CDC".

When the MF switch 13 is pressed further again, the MF switch 13 select MDC as a function, the icon changes from CDC to MDC, a letter indicating the function presently selected is changed from "CDC" to "MDC", and a letter "CD" indicating a function that is selected next is displayed adjacently to the letter "MDC".

Then, when the MF switch 13 is pressed furthermore again, the initial display form is recovered, that is, a function presently selected is set up CD, while a function to be selected next is set up MD.

In the display form shown in FIG. 6A, a disposition relation between a letter indicating a function presently selected and that indicating a function to be selected next may be different depending upon the function presently selected, resulting in that the function to be selected next may not be distinguished immediately.

Figure 6B:
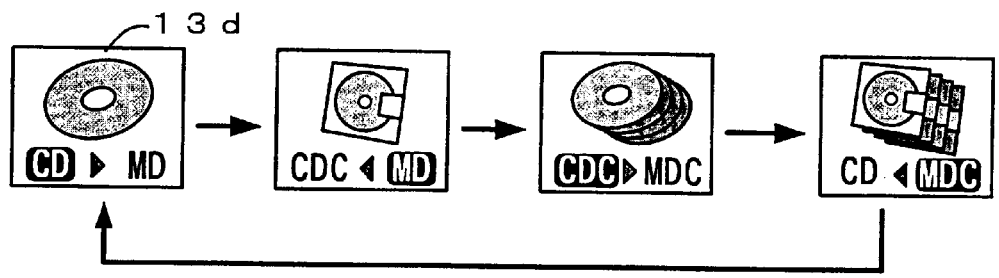

Consequently as shown in FIG. 6B, an arrow from a letter indicating a function presently selected to a letter indicating a function to be selected next may be displayed.

Figure 6C:
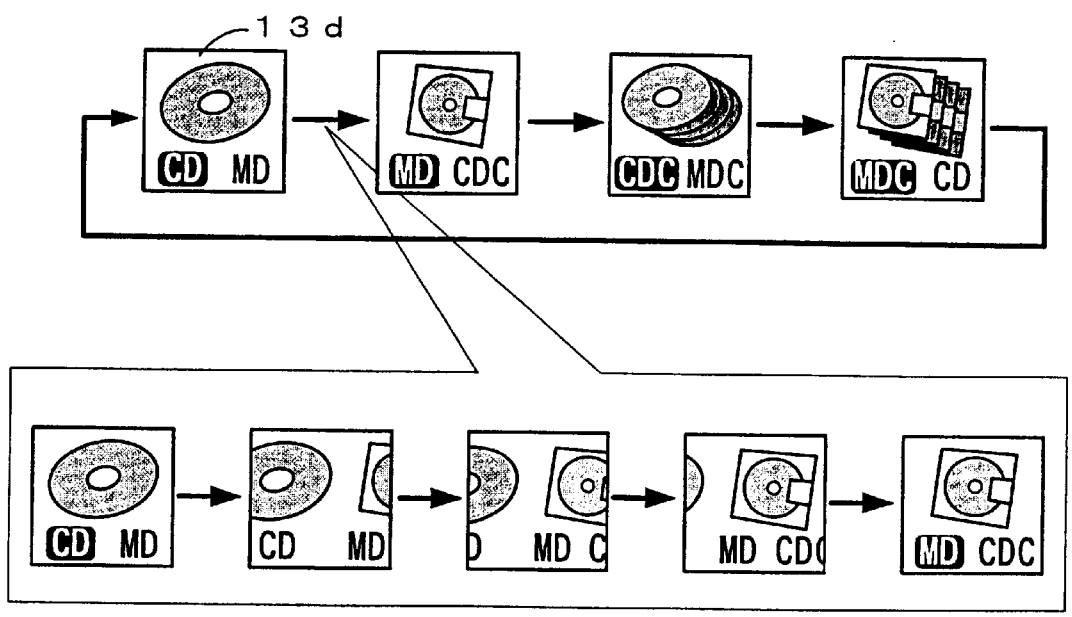

Instead of the arrow, as shown in FIG. 6C, a disposition relation between a letter indicating a function presently selected and that indicating a function to be selected next may be determined, for example, the letter indicating a function to be selected next may be displayed right next to a letter indicating a function presently selected.

Further, as shown in FIG. 6C, the switching of the function may be displayed with a scroll display by using animation. That is, When the MF switch 13 is pressed so as to switch the function from CD to MD, on the display screen each letter together with an icon of CD flow in one direction, for example from right to left, then according to the flow, a letter indicating a function (MD) presently selected and a letter indicating a function (CDC) to be selected next together with the icon of MD presently selected come from the right side, and finally on the display screen of the display device 13d, the icon of CDC, a letter indicating a function (MD) presently selected and a letter indicating a function (CDC) to be selected next are displayed in different displaying images from each other.

Figure 6D:
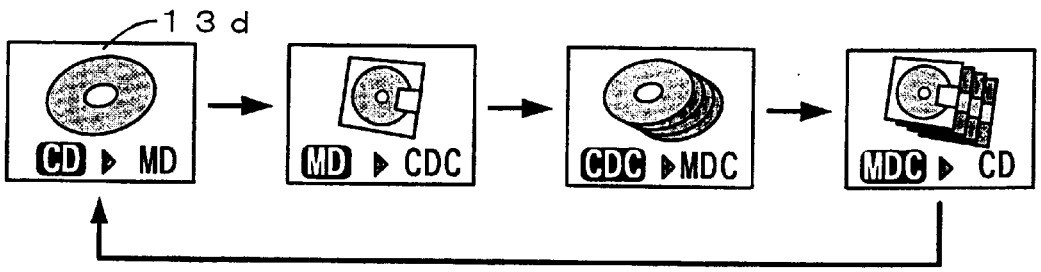

As shown in FIG. 6D, even when a disposition relation between a letter indicating a function presently selected and that indicating a function to be selected next is determined, an arrow indicating a selecting direction may be displayed between the letters.

In the above description, the same kind of the storage medium such as CD, MD, CDC, and MDC is selected in turn each time the MF switch 13 is pressed.

However, as shown in FIG. 7A, the switching object is not limited to the same kind of functions. A switching from television to CD or from cassette tape to radio can be possible according to the need of users.

In the above description, a case, in which various functions are cyclically selected with the MF switch 13 employing a pushing switch, is explained. Instead, a seesaw switch shown in FIG. 5 is employed in the MF switch, thereby two kinds of equipments to be selected next can be set up with regard to an equipment presently selected with only one MF switch 13.

As shown in FIG. 7B, an icon of television as an equipment presently selected is displayed on the screen of the display device 13d, a letter "TV" indicating television is displayed right under the icon, a letter "FM" indicating FM broadcasting of a car radio that is an equipment to be selected next is displayed left next to the letter "TV" by pressing the left end of the MF switch 13, and a letter "CD" indicating a CD player that is an equipment to be selected next is displayed right next to the letter "TV" indicating an equipment presently selected by pressing the right end of the MF switch 13.

As a result, when the MF switch is pressed at the part thereof displayed as CD, a function presently selected is switched to CD while the icon is switched from television to CD, and a letter indicating an equipment presently selected is switched to "CD". At this time, a letter indicating an equipment to be selected next, which is displayed left next to the letter "CD", is switched to "TV", while a letter indicating an equipment to be selected next, which is displayed right next to the letter "CD", is switched to "MD".

When the MF switch is pressed again at the part thereof displayed as MD, a function presently selected is switched to MD while the icon is switched from CD to MD, and a letter indicating an equipment presently selected is switched to "MD". At this time, a letter indicating an equipment to be selected next, which is displayed left next to the letter "MD", is switched to "CD", while a letter indicating an equipment to be selected next, which is displayed right next to the letter "MD", is switched to "TAPE".

As described above, when a seesaw switch is employed for the MF switch 13, a desired function can be selected with a small number of times for the operation of the switch depending upon a setting of selection sequence of each equipment.

As shown in FIG. 7C, an arrow indicating a direction of the operation upon selecting an equipment to be selected next may be displayed between a letter indicating an equipment presently selected and a letter indicating an equipment to be selected next, which is displayed left or right next to the letter indicating an equipment presently selected.

In the above description, objects for selecting by using the MF switch 13 employing a pushing switch are audio equipments. Instead, the MF switch 13 can be applied to a use for selecting a radio station one after another from a plurality of radio stations preset in advance by selecting each receiving frequency.

For example, as shown in FIG. 8A, on the screen of the display device 13d, a number 77.1 indicating a receiving frequency presently selected and a number 78.0 indicating a receiving frequency to be selected next, which is displayed right next to the number 77.1, are displayed with different displaying images, and further, a preset number "PRESET 1" presently selected is displayed under these numbers of the receiving frequencies.

When the MF switch 13 is pressed, the receiving frequency 77.1 presently selected is changed to the receiving frequency 78.0 to be selected next, which has been displayed, then a receiving frequency to be selected next is changed to 79.5. At the same time, the preset number presently selected is changed to "PRESET 2".

When a seesaw switch is employed for the MF switch 13 for selecting the receiving frequency, a desired broadcasting station can be selected with a small number of times for the operation of the switch.

For example, as shown in FIG. 8B, the number 77.1 of the receiving frequency presently selected is displayed at the center of the screen of the display device 13d. Then, a first receiving frequency 81.3 to be selected next is displayed left next to the receiving frequency 77.1 with a different displaying image from that of the receiving frequency 77.1, a second receiving frequency 78.0 to be selected next is displayed right next to the receiving frequency 77.1 with a different displaying image from that of the receiving frequency 77.1 and then, the preset number PRESET 1 presently selected is displayed under the receiving frequency 77.1.

When a position of 78.0 displayed on the surface of the key-top 13g of the MF switch 13 is pressed, the receiving frequency 77.1 presently selected is changed to the receiving frequency 78.0 to be selected next, which has been already displayed, the second receiving frequency to be selected next is changed from 78.0 to 79.5, while the first receiving frequency to be selected next is changed from 81.3 to 77.1. At the same time, the preset number presently selected is changed to "PRESET 2".

As shown in FIG. 8C, an arrow indicating a direction of the operation upon selecting a next receiving frequency may be displayed on the numbers indicating the first and second receiving frequencies.

In the following, an outline of the electrical constitution of the multifunction switch device with a display function according the first preferred embodiment will be explained.

FIG. 15 is a block diagram illustrating an electrical constitution of the multifunction switch device with a display function. As shown in FIG. 15, a microcomputer 16, which controls the display device 13d according to the pressing operation by the switch 13c (in case of a pushing switch) or the switch 13f (in case of a seesaw switch), consists of a CPU 16a, RAM 16b and ROM 16c.

Buttons 15a to 15h for setting reservation, each of which outputs a signal for making a reservation to the CPU 16a with having the selecting objects, such as CD, MD, CDC, MDC, TV, TAPE, FM and AM broadcasting of a car radio (not shown in the figure), are connected to the CPU 16a via respective input/output ports. Audio equipments that are the objects for selecting such as playback equipments 17a to 17d of CD, MD, CDC and MDC, respectively, TV receiver 17e and car radio 17f are connected to an output port of the CPU 16a via respective interfaces I/F.

The MF switch 13 is connected to the input/output ports of CPU 16a, data displayed by the display device 13d in the MF switch 13 is read out from CPU 16a and transferred to the display device 13d, thereby the image plane is changed. The reading out sequence of the displayed data that are read out according to the pressing operation of the switch is determined depending upon a sequence, in which each equipment setted up by the buttons 15a–15h for setting reservation is selected as "an equipment presently selected". The displayed data are not limited to the data of the equipment. The displayed data may be data of each receiving frequency that specifies a radio broadcasting station or data of receivng channel numbers of TV stations.

In the RAM 16b, there is provided a working area for use in a data area and various processing operations. In the working area, there are provided areas for use in various flags and buffers. In the ROM 16c, there is installed a controlling program for allowing the CPU 16a to carry out various processing operations.

In the following, processings carried out by CPU 16a according to the controlling program installed in the ROM 16c will be explained with reference to flow charts shown in FIGS. 16 and 17. A flow chart shown in FIG. 16 illustrates a display control processing in response to the selection of the functions shown in FIG. 6.

By switching on an accessory switch (not shown in the figure), the microcomputer 16 is supplied an electric power from a battery (not shown in the figure) and the like, which is loaded on a vehicle, and is started to start a program, then the CPU 16a carries out an initialization, which includes to set up each flag area in the RAM 16b to be "0" (step S1).

When the initialization is finished, a signal is input from the input/output ports, which is connected to the MF switch 13, and it is judged whether the type of the switch is a push switch or a seesaw switch (step S3). If judged a push switch, a preserved function (equipment) such as CD, TV and MD is judged on the basis of the signal received from a respective input port (step S7). As a result of this judgement, if the preserved equipment is a playback equipment such as CD, MD, CDC and MDC, and when a specific equipment is set to be the equipment presently selected, an equipment to be selected next is determined with respect to this specific equipment, thereby a selection sequence is determined (step S9). As shown in FIG. 6, this selection sequence is as follows: when CD is set to be the equipment presently selected, an equipment to be selected next is set to be MD; when MD is set to be the equipment presently selected, an equipment to be selected next is set to be CDC; when CDC is set to be the equipment presently selected, an equipment to be selected next is set to be MDC; and when MDC is set to be the equipment presently selected, an equipment to be selected next is set to be CD.

When the selection sequence is determined as described above, the display screen of the display device 13d is initialized (step S11), as shown in FIG. 6 an icon of CD as the presently selected equipment is displayed, and in addition, a letter "CD" and a letter "MD" indicating the equipment to be selected next are displayed in a line under the icon of CD with a different displaying image. This state is an operating state of CD (step S13), but when MD is desired to be operated, the MF switch 13 is pressed to make it switched on (step S15).

As a result, as shown in FIG. 6 an icon of MD is displayed, a letter CDC indicating an equipment to be selected next is displayed, thereby the display contents are changed (step S17). Then, MD is made to be in operation (step S19). But when the equipment presently selected is desired to be MDC, steps S21–S27 are further processed, and in step S29, the icon of MDC, which is an equipment desired to be a presently selected equipment, is displayed, thereby the display contents are changed. Then, MDC is made to be in operation (step S31).

When a seesaw switch is selected in step S3, a process is carried out according to a flow chart shown in FIG. 17, that is, as shown in FIG. 7B the screen of the display device is changed so that an equipment to be selected next is displayed at both sides of the equipment presently selected.

To begin with, as a display controlling precess, as shown in FIG. 7B an icon of TV that is an equipment presently selected is displayed on the screen, a letter "TV" is displayed under the icon, a letter "CD" that is an equipment to be selected next is displayed at right next to the letter "TV", while a letter "FM" indicating an FM band in a car radio that is an equipment to be selected next is displayed at left next to the letter "TV" (step S501).

In this displaying state, a TV is made to be in its operation state. When the driver wants to use a CD, a position displayed as CD at the right end of the key-top 13g of the seesaw switch (SSW) is pressed to switch on the switch (step S503), thereby the displayed contents of the display device 13d are changed (step S505), an icon of CD that is an equipment presently selected is displayed on the screen, a letter "CD" instead of TV is displayed under the icon, a letter "TV" that indicates an equipment to be selected next is displayed left next to the letter "CD", while a letter "MD" that indicates an equipment to be selected next is displayed right next to the letter "CD". Then, CD is made to be in operation.

Further, when the driver wants to select a MD, a position displayed as MD at the right end of the key-top 13g is pressed to switch on the switch (step S509), thereby the displayed contents of the display device 13d are changed (step S511), an icon of MD that is an equipment presently selected is displayed on the screen, a letter "MD" instead of CD is displayed under the icon, a letter "CD" that indicates an equipment to be selected next is displayed left next to the letter "MD", while a letter "TAPE" that indicates an equipment to be selected next is displayed right next to the letter "MD". Then, MD is made to be in operation (step S513).

When the driver wants to select a CD from a MD, a position displayed as CD of the key-top 13g is pressed to switch on the switch (step S515), thereby the contents displayed by the display device 13d are changed to the contents before the selection (step S505).

Second Preferred Embodiment

In the aforementioned first preferred embodiment, a multifunction switch is used, in which the contents of the display are changed when a function presently selected is changed by pressing the switch, therefore many switching operations are needed until the driver selects a desired function.

In this respect, in the second preferred embodiment, as shown in FIG. 9 a switching panel P of a switch device 13A is provided with a button 15A for directly selecting (hereinafter, DPB) instead of the buttons for setting up reservation. This DPB15A has buttons DPB15A1, DPB15A2 and DPB15A3. As shown in FIG. 13, the DPB15A1 changes a display on each display screen 131–134 of the MF switch 13 with a single button operation from a normal guiding display of the TV channels and a display of selecting TV receiver (TV mode) to a guiding display of DVD screen or TV game screen (option mode), or changes inversely. As shown in FIG. 10, the DPB15A2 changes a mode from a display (CD mode) for guiding of a changer operation, which operates a single CD player or continuously selectively operates a plurality of CD players, to a display (MD mode) for guiding of a changer operation, which operates a single MD player or continuously selectively operates a plurality of MD players, or changes inversely. As shown in FIG. 14, the DPB15A3 changes a mode from a display (AM tuner mode) for guiding a selection of AM broadcasting and a display for guiding a receiving frequency to a display (FM tuner mode) for guiding a selection of FM broadcasting and a display for guiding a receiving frequency, or changes inversely.

As shown in a switching panel P of the switching device 13A shown in FIG. 11, the DPB15A2 may be set up as a DPB, which changes a mode from a display (single player mode) for guiding operation of a player for a single CD or MD to a display (changer mode) for guiding operation of a changer that operates continuously selectively a plurality of CDs or MDs, or changes inversely. In this case, contents displayed in FIG. 12 are displayed on a screen 132.

Users can optionally set up the objects for the selection by the DPB.

In the following, a selecting process of each screen 131–135 of the MF switch 13 in response to a mode selection by a button operation of the DPB will be explained with reference to each flow chart shown in FIGS. 18–20. To eliminate the redundancy, only a characteristic portion of the processing will be explained below. As shown in FIG. 18, when the CPU 16a receives a signal from the DPB instead of the button for reserving the setting (step S35), it is judged from which DPB out of the DPB15A1–DPB15A3 a signal for selection is input on the basis of a input port address into which the signal is input. At this time, for example, when it is judged that the signal is input from the DPB15A2, which changes a mode between a CD mode and a MD mode (step S41), the system advances to a process of mode judging 2 (step S43).

At the mode judging 2, it is judged whether the mode selection is a CD mode selection or a MD mode selection (step S431), then for example, when judged to be a MD mode selection, displayed contents on each screen 131–134 of the MF switch 13 are set to be contents, which agree with contents in a MD mode shown in FIG. 10 (step S435). As to displayed contents in the MD mode, initially, an icon of MD indicating an equipment presently selected and an icon of MDC indicating an equipment to be selected next are displayed at left and right on a key-top 131 (screen) of the MF switch 13 employing a pushing switch with different displaying image from each other, and a letter MD and a letter MDC are displayed under the respective icons with different displaying image from each other.

Initially, the screen 132 displays only a letter "PLAY MODE". The screen 133 has no display. The screen 134 is a key-top of the MF switch employing a seesaw switch, on which a letter "TRACK" indicating a MD performance track and a variable track number are displayed. Under these displays, an operation symbol for use in advancing the track is displayed at the right side of the screen 134, while an operation symbol for use in returning the track is displayed at the left side of the screen 134.

When the MD mode is displayed, as shown in a flow chart in FIG. 20A, by detecting a SW1 signal output from the MF switch, it is judged whether or not the MF switch (SW1) having the screen 131 is set ON for setting up an equipment to be selected next (step S435-1, S435-3).

If the SW1 is judged not ON, an operation of MD, which is presently selected, is started (step S435-5). On the other hand, if the SW1 is judged ON, each content displayed on the screen 131 and 133 is changed (step S435-9).

On the screen 131, as an icon indicating an equipment presently selected, an icon of MD is changed to that of MDC, while as an icon indicating an equipment to be selected next, an icon of MDC is changed to that of MD, and in addition, a letter MD and a letter MDC are displayed under the respective icons with a different displaying image from each other.

On the screen 133, there are displayed a letter "DISC" indicating a performance disc in MDC and a variable performance disc number. Under these displayes, an operation symbol "+" for use in advancing the performance disc is displayed at the right side of the screen 134, while an operation symbol "−" for use in returning the performance disc is displayed at the left side of the screen 134. After changing the displayed images, the MDC is made to be in an operation state (step S435-11). When the SW1 is judged ON in MDC operation, each screen is changed to a MD-oriented image (step S435-13).

In the following, a displaying process by the display device upon the operation of MD will be explained with reference to a flow chart shown in FIG. 20B. While the MD is in operation, a SW4 signal from the MF switch (SW4) having the screen 134 as a key-top is detected (step S435-5B). Then, "n" indicating a track number is initialized to be "0" (step S435-5C). On the basis of the detected signal SW4, it is judged whether or not the right side of the seesaw switch is ON (step S435-5D). If judged ON, "1" is added to "n (initially 0)" to advance the track number (step S435-5E).

The "n" that is "0" is transferred to a register m and contents of the register m are displayed on the screen 134 as the track number (steps S435-5G, S435-5H). After the track number is displayed, the SW4 signal is detected again, the track number is maintained and displayed if not ON (steps S435-5I, 435-5H). While the track is advanced through each steps S435-5D, S435-5E, S435-5G, S435-5H and S435-5I, if it is judged that the left side of the seesaw switch becomes ON at the step S435-5D, "1" is subtracted from the contents of the resister m and a track number, in which the contents are returned, is displayed (steps S435-5F, S435-5H).

When the MDC is in operation, the increase and decrease in the track number is displayed on the screen 4, and in addition, the increase and decrease in the performance disc number is displayed on the screen 3. In the following, as a processing by the display device upon an operation of MDC, a process of displaying the increase and decrease in the performance disc number will be explained with reference to a flow chart shown in FIG. 21A.

While the MDC is in operation, a SW3 signal from the MF switch (SW3) having the screen 133 as a key-top is detected (step S435-11A). Then, "n" indicating a performance disc number is initialized to be "0" (step S435-11B). On the basis of the detected signal SW3, it is judged whether or not the right side of the seesaw switch is ON (step S435-1 IC). If judged ON, "1" is added to "n (initially 0)" to advance the performance disc number (step S435-11D).

The "n" that is "0" is transferred to a register m and contents of the register m are displayed on the screen 133 as the performance disc number (steps S435-11F, S435-11G). After the performance disc number is displayed, the SW3 signal is detected again, the performance disc number is maintained and displayed if not ON (steps S435-11G, 435-11H). While the performance disc is advanced through each steps S435-11C, S435-11D, S435-11F, S435-11G and S435-11H, if it is judged that the left side of the seesaw switch becomes ON at the step S435-11C, "1" is subtracted from the contents of the resister m and a performance disc number, in which the contents are returned, is displayed (steps S435-11E, S435-11H).

As a processing by the display device upon an operation of MDC, a process of displaying the increase and decrease in the track number is shown in a flow chart in FIG. 21B, which is substantially the same as that in the performance disc number.

In the CD mode, single player mode, changer mode, TV mode, option mode, AM tuner mode, and FM tuner mode, a process of displaying the increase and decrease in the number and a process of selecting an equipment from that presently selected to that to be selected next are in common with those in the MD mode, which is explained above.

In the following, a function of the MF switch 13, in which "PLAY MODE" is displayed on the screen 132, will be explained with reference to FIG. 12. The single player mode is selected by pressing an operating button 15A2 (see FIG. 11) and each screen 131–134 is initialized to display an initial image, then a position displayed "PLAY MODE" is pressed so as to change the screen 131–134 to display "RETURN", "SCAN", "RAND" and "RPT".

When the position displaying "RETURN" is pressed, each screen 131–134 returns to the initial screen. If the operation object is "MD", when the position "SCAN" is pressed, the MD is playbacked with selecting a piece of music in turn from the track number 1 to 20, for example. When the position "RAND" is pressed, the MD is playbacked with selecting a piece of music at random, that is, without determining a sequence of the track number selection. When the position "RPT" is pressed, a piece of music presently performed is repeatedly playbacked.

The Changer mode is selected by pressing an operating button 15A2 (see FIG. 11) and each screen 131–134 is initialized to display an initial image, then a position displayed "PLAY MODE" is pressed so as to change the screen 131–134 to display "RETURN", "(DISC/SCAN):SCAN", "(DISC/RAND):RAND" and "(DISC/RPT):RPT".

When the position "RETURN" is pressed, each screen 131–134 returns to the initial screen. If the operation object is "MDC", when the position "SCAN" is pressed, each beginning part for about ten seconds for all pieces of music in the MD presently used is playbacked in turn continuously. Then, when the position "SCAN" is pressed again, the scan mode is canceled and a piece of music presently being playbacked is kept playbacked.

When the position "RAND" is pressed, a piece of music is selected at random from those included in the MD presently used and is playbacked. Then, when the position "RAND" is pressed again, the random mode is canceled and a piece of music presently being playbacked is kept playbacked.

When the position "RPT" is pressed, a piece of music presently being playbacked is kept playbacked. Then, when the position "RPT" is pressed again, the repeat mode is canceled. The same piece of music is repeatedly playbacked until the repeat mode is canceled.

When the position "DISC/SCAN" is pressed, each beginning part for about ten seconds of a first piece of music for respective CD in the changer is playbacked in turn continuously. Then, when the position "DISC/SCAN" is pressed again, the disc scan mode is canceled and a piece of music of the CD presently being playbacked is kept playbacked.

When the position "DISC/RAND" is pressed, a piece of music is selected at random from the changer and is playbacked.

When the position "DISC/RPT" is pressed, a CD presently being playbacked is playbacked repeatedly. Then, when the position "DISC/RPT" is pressed again, the disc repeat mode is canceled. The same CD is repeatedly playbacked until the disc repeat mode is canceled.

A function of "PLAY MODE" shown in FIG. 10 is similar to the function described above.

The aforementioned preferred embodiments are described to aid in understanding the present invention and variations may be made by one skilled in the art without departing from the spirit and scope of the present invention.

What is claimed is:

1. A multifunction switch device with a display function comprising:

a switch part for displaying a character indicating an operating object equipment on an operating button by a display measure whenever the operating button is operated;

setting means for setting up an operating object equipment;

judging means for judging an operating object equipment set up on the basis of an output from the setting means;

operating sequence determining means for determining an operating object equipment, which is operated next to the operating object equipment presently operated by the operating button, from the judged operating object equipment;

image generating means for generating each character, which indicates the operating object equipment presently operated or that to be operated next according to the operating sequence determined by the operating sequence determining means and for transmitting each character to the display measure; and detecting means for detecting an operating of the operating button and for transmitting a detected signal to the image generating means, wherein the image generating means changes each character, which indicates the operating object equipment presently operated or that to be operated next on the basis of the detected signal by the detecting means.

2. The multifunction switch device with a display function according to claim 1, wherein the setting means sets up at least two operating object equipments and selectively sets up the operating object equipments.

3. The multifunction switch device with a display function according to claim 1, wherein the operating button has a switch part, which can select at least two operating object equipments out of a plurality of the operating object equipments to be operated next with relation to the operating object equipment presently operated, and the image generating means generates at least two character images indicating the operating object equipment to be operated next and transmits each character to the display measure.

4. The multifunction switch device with a display function as claimed in any one of claims 1 to 3, wherein upon selecting the operating object equipment to be operated next by the operating button, a character of the operating object equipment presently operated, which is displayed by the display measure, is scrolled to a display of a character of the selected operating object equipment to be operated next so that the character displayed by the display measure is changed.

* * * * *